United States Patent
Yang

(10) Patent No.: US 11,625,600 B2
(45) Date of Patent: Apr. 11, 2023

(54) NEURAL NETWORK SYSTEM FOR PREDICTING POLLING TIME AND NEURAL NETWORK MODEL PROCESSING METHOD USING THE SAME

(71) Applicant: SAMSUNG ELECTRONICS CO., LTD., Suwon-si (KR)

(72) Inventor: Seung-soo Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 805 days.

(21) Appl. No.: 16/532,885

(22) Filed: Aug. 6, 2019

(65) Prior Publication Data
US 2020/0210827 A1 Jul. 2, 2020

(30) Foreign Application Priority Data
Dec. 31, 2018 (KR) .................. 10-2018-0174269

(51) Int. Cl.
G06N 3/08 (2006.01)
G06F 9/50 (2006.01)
G06F 9/48 (2006.01)

(52) U.S. Cl.
CPC ............. *G06N 3/08* (2013.01); *G06F 9/4881* (2013.01); *G06F 9/5027* (2013.01); *G06F 9/5066* (2013.01)

(58) Field of Classification Search
None
See application file for complete search history.

(56) References Cited

U.S. PATENT DOCUMENTS

| | | | |
|---|---|---|---|
| 5,946,647 A | 8/1999 | Miller et al. | |
| 6,487,641 B1* | 11/2002 | Cusson | G06F 16/9574 711/144 |
| 8,035,636 B1* | 10/2011 | Yang | G06T 15/00 345/473 |
| 8,392,923 B2 | 3/2013 | Walters | |
| 9,396,033 B2 | 7/2016 | Lee et al. | |
| 9,721,322 B2 | 8/2017 | Nagai | |
| 10,042,711 B1* | 8/2018 | Chopra | G06F 11/1448 |
| 10,887,235 B2* | 1/2021 | Thambidorai | H04L 47/125 |
| 2003/0182652 A1* | 9/2003 | Custodio | G06F 8/62 717/122 |
| 2005/0105503 A1* | 5/2005 | Cayla | H04J 3/16 370/346 |
| 2008/0016282 A1* | 1/2008 | Sakamoto | G06F 12/0846 711/131 |

(Continued)

FOREIGN PATENT DOCUMENTS

JP 2015-056007 A 3/2015

OTHER PUBLICATIONS

Singapore Office action dated Mar. 2, 2023.

*Primary Examiner* — Adam Lee
(74) *Attorney, Agent, or Firm* — Lee IP Law, P.C.

(57) ABSTRACT

A neural network system for predicting a polling time and a neural network model processing method using the neural network system are provided. The neural network system includes a first resource to generate a first calculation result obtained by performing at least one calculation operation corresponding to a first calculation processing graph and a task manager to calculate a first polling time taken for the first resource to perform the at least one calculation operation and to poll the first calculation result from the first resource based on the calculated first polling time.

20 Claims, 20 Drawing Sheets

(56) References Cited

U.S. PATENT DOCUMENTS

| | | | |
|---|---|---|---|
| 2008/0120490 A1* | 5/2008 | Brown | G06N 5/003 |
| | | | 712/216 |
| 2009/0089784 A1* | 4/2009 | Walters | G06F 9/485 |
| | | | 718/102 |
| 2011/0067016 A1* | 3/2011 | Mizrachi | G06F 8/456 |
| | | | 717/149 |
| 2012/0069035 A1* | 3/2012 | Bourd | G06F 9/54 |
| | | | 345/557 |
| 2012/0110247 A1* | 5/2012 | Eleftheriou | G06F 12/0246 |
| | | | 711/E12.008 |
| 2012/0243036 A1* | 9/2012 | Aoki | G06F 3/1259 |
| | | | 358/1.15 |
| 2013/0219133 A1* | 8/2013 | Shishido | H04L 43/0817 |
| | | | 711/E12.001 |
| 2014/0092103 A1* | 4/2014 | Saulters | G06F 1/325 |
| | | | 345/501 |
| 2014/0165065 A1 | 6/2014 | Kamata | |
| 2015/0234922 A1* | 8/2015 | Dageville | G06F 9/5044 |
| | | | 707/770 |
| 2016/0077969 A1* | 3/2016 | Seo | G06F 12/0864 |
| | | | 711/133 |
| 2016/0292092 A1* | 10/2016 | Gavens | G06F 3/0629 |
| 2017/0212563 A1 | 7/2017 | Farazmand et al. | |
| 2018/0006806 A1* | 1/2018 | Wang | H04L 9/0631 |
| 2018/0139488 A1 | 5/2018 | Maker, III | |
| 2018/0197267 A1 | 7/2018 | Wu et al. | |
| 2019/0065560 A1* | 2/2019 | Rojkov | G06F 16/2272 |
| 2019/0205153 A1* | 7/2019 | Niestemski | H04L 41/0681 |
| 2019/0286973 A1* | 9/2019 | Kovvuri | G06N 3/04 |
| 2020/0192455 A1* | 6/2020 | Kumar | G06F 1/3253 |
| 2020/0210851 A1* | 7/2020 | Moore | G06K 9/6256 |

\* cited by examiner

FIG. 11

CPC_RS

| OPERATION | TIME |
|---|---|
| OP1(Size1) | t1 |
| OP1(Size2) | t2 |
| OP2 | t3 |
| OP3 | t4 |

FIG. 13

PPT

| SUB GRAPH | RS Char. | POLLING TIME |
|---|---|---|
| SG1 | CH1 | t1 |
| SG1 | CH2 | t2 |
| SG2 | CH1 | t3 |
| SG3 | CH3 | t4 |

NEURAL NETWORK SYSTEM FOR PREDICTING POLLING TIME AND NEURAL NETWORK MODEL PROCESSING METHOD USING THE SAME

CROSS-REFERENCE TO RELATED APPLICATION

Korean Patent Application No. 10-2018-0174269, filed on Dec. 31, 2018, in the Korean Intellectual Property Office, and entitled: "Neural Network System for Predicting Polling Time and Neural Network Model Processing Method Using the Same," is incorporated by reference herein in its entirety.

BACKGROUND

1. Field

Embodiments relate to a neural network system for performing deep learning on an input model by using a calculation processing graph of a neural network and, more particularly, to a neural network system which predicts a polling time for polling a calculation result of a calculation processing graph and a neural network model processing method using the neural network system.

2. Description of the Related Art

An artificial neural network (ANN) refers to a computational architecture obtained by modeling a biological brain. Deep learning or machine learning may be implemented based on a neural network. Recently, as the number of calculations processed based on the neural network increases rapidly, efficient performance of calculation processing based on the neural network is needed.

SUMMARY

According to an aspect, there is provided a neural network system for processing a first calculation processing graph, the neural network system including a first resource to generate a first calculation result obtained by performing at least one calculation operation corresponding to the first calculation processing graph and a task manager to calculate a first polling time taken for which the first resource to perform the at least one calculation operation, and poll the first calculation result from the first resource based on the calculated first polling time.

According to another aspect, there is provided a method of processing a neural network model by using a calculation processing graph including a first subgraph, the method including calculating a first polling time taken to perform a first calculation operation corresponding to the first subgraph, based on information about the first subgraph, generating first execution data by compiling the first subgraph to be driven by a first resource, outputting the first execution data to the first resource, and polling a first calculation result corresponding to the first execution data from the first resource after the first polling time elapses from a time when the first execution data is output to the first resource.

According to another aspect, a method of processing a neural network model by using a calculation processing graph including a subgraph, the method including generating execution data by compiling the subgraph to be driven by a resource, outputting the execution data to the resource, outputting a first polling signal for polling a calculation result corresponding to the execution data from the resource after a first polling time elapses from a time when the execution data is output to the resource; and outputting a second polling signal for polling the calculation result after a second polling time elapses from a time when the first polling signal is output, the second polling time being different from the first polling time.

According to another aspect, there is provided a computer-based neural network system for finding a calculation processing graph corresponding to a structure of data to perform at least one calculation operation corresponding to the found calculation processing graph, the computer-based neural network system including an input device configured to receive input data, a memory configured to program information including information about a model analyzer configured to find a calculation processing graph from the input data and information about a task manager configured to generate a calculation result corresponding to the calculation processing graph based on the calculation processing graph, a processor configured to process the input data based on the program information, and a resource configured to perform the at least one calculation operation corresponding to the calculation processing graph, wherein the processor is configured to calculate a polling time, which is a time taken in performing the at least one calculation operation based on program information about the task manager, and poll the calculation result from the resource based on the polling time.

BRIEF DESCRIPTION OF THE DRAWINGS

Features will become apparent to those of skill in the art by describing in detail exemplary embodiments with reference to the attached drawings in which:

FIG. 11 illustrates a calculation processing table according to an exemplary embodiment;

FIG. 13 illustrates a polling timetable according to an exemplary embodiment;

DETAILED DESCRIPTION

Figure 1:
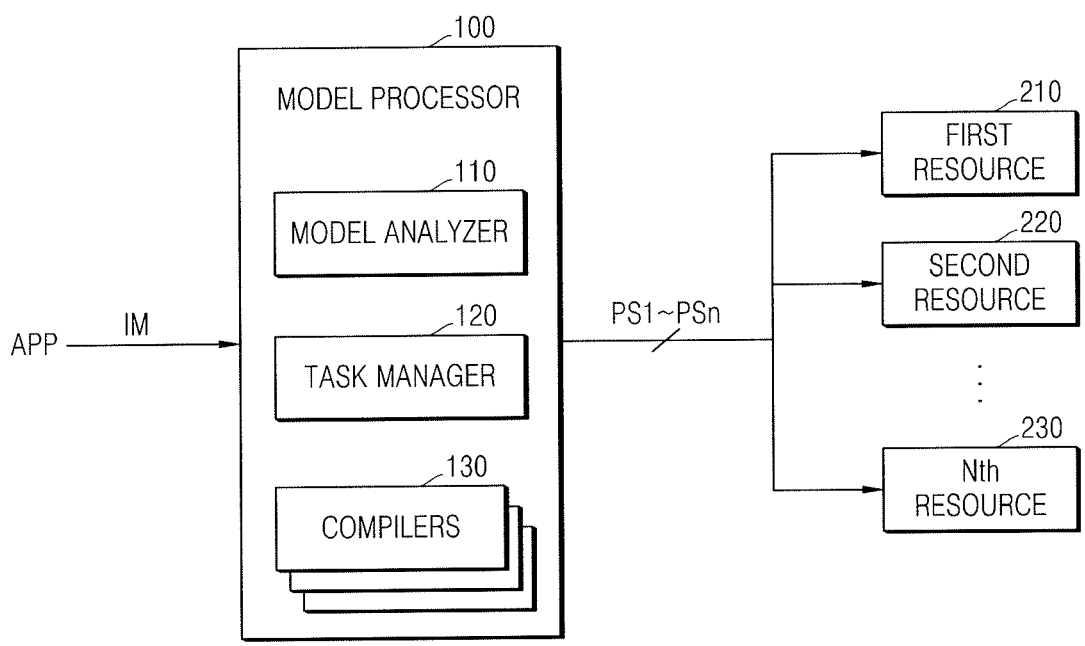
FIG. 1 illustrates a neural network system according to an exemplary embodiment.

FIG. 1 illustrates a neural network system 10 according to an exemplary embodiment. Referring to FIG. 1, the neural network system 10 may include a plurality of applications APP, a model processor 100, and a plurality of resources (for example, first, second, and $N^{th}$ resources 210 to 230).

The plurality of applications APP may be generated by various application programming interfaces, and various operations using a neural network model. Examples of the neural network model may include various kinds of neural network models such as region with convolution neural network (R-CNN), region proposal network (RPN), recurrent neural network (RNN), stacking-based deep neural network (S-DNN), deep belief network (DBN), restricted Boltzmann machine (RBM), fully convolutional network, long short term memory (LSTM) network, classification network, convolution neural network (CNN), e.g., GoogLeNet, AlexNet, and VGG network, and so on. Also, the neural network model for performing one task may include a plurality of sub neural networks, the sub neural networks may include different kinds of neural networks, and the sub neural networks may be implemented with different kinds of neural network models.

The plurality of applications APP may output an input model IM to the model processor 100 to issue a request, to the model processor 100, to perform data processing based on the neural network model.

The model processor 100 may include a model analyzer 110, a task manager 120, and a plurality of compilers 130. Each element included in the model processor 100 may be implemented in software, e.g., with a neural network platform such as an evolutionary deep network (EDEN). In another configuration, the elements included in the model processor 100 may each be implemented in hardware, e.g., an electronic circuit. In another configuration, some elements in the model processor 100 may be implemented in software and other elements may be implemented in hardware. In an embodiment, the model processor 100 may be implemented with a framework of a neural network.

The model analyzer 110 may receive the input model IM, including data for using a neural network, from each of the plurality of applications APP, and may generate a calculation processing graph having a plurality of subgraphs. The calculation processing graph may denote a data structure expressed as a graph including a plurality of calculation nodes. The model analyzer 110 may divide the calculation processing graph into structures suitable for processing performed by the first to third resources 210 to 230. The model analyzer 110 may output the calculation processing graph and the plurality of subgraphs to the task manager 120.

The task manager 120 may allocate the plurality of subgraphs including the calculation nodes to the plurality of resources 210 to 230. The task manager 120 may allocate each of the plurality of resources 210 to 230 respectively suitable for the plurality of subgraphs, based on a structural feature of each of the plurality of subgraphs or the kind of calculation included in each subgraph. The task manager 120 may output, through a separate communication path, each of the plurality of subgraphs to each of the plurality of compilers 130 corresponding to an allocated resource.

The plurality of compilers 130 may perform a compiling operation of translating a subgraph, received from the task manager 120, into a program language understandable by a resource. Each of the plurality of compilers 130 may correspond to one resource and may compile a subgraph, received from the task manager 120, into a program language of a corresponding resource. In an embodiment, a first compiler of the plurality of compilers 130 may correspond to the first resource 210 and may compile the received subgraph into a program language corresponding to the first resource 210, a second compiler of the plurality of compilers 130 may correspond to the second resource 220 and may compile the received subgraph into a program language corresponding to the second resource 220, and so on to the Nth resource 230. Each of the plurality of compilers 130 may compile a subgraph to generate execution data and may output the generated execution data to a corresponding resource of the first to Nth resources 210 to 230. In an embodiment, the execution data may be implemented with a program file translated into a program language corresponding to a resource.

The plurality of resources 210 to 230 may include a calculation resource and a communication resource. For example, a plurality of calculation resources may include various calculation processing devices, e.g., a central processing unit (CPU), a graphics processing unit (GPU), an application processor (AP), a digital signal processor (DSP), a field-programmable gate array (FPGA), a neural network processing unit (NPU), an electronic control unit (ECU), an image signal processor (ISP), and the like. The calculation resource may include dedicated hardware. For example, the NPU may be dedicated hardware which is used to process calculations using a neural network model.

A plurality of communication resources may be resources for supporting internal communication, e.g., peripheral component interconnect (PCI), PCI express (PCIe), serial advanced technology attachment (SATA), small computer system interface (SCSI), serial attached SCSI (SAS), and the like, and/or external communication such as universal serial bus (USB), Ethernet, Wi-Fi, Bluetooth, near field communication (NFC), radio frequency identification (RFID), mobile telecommunication, and the like.

The plurality of resources 210 to 230 may include different kinds of resources. In an embodiment, the first resource 210 may be an NPU and the second resource 220 may be a GPU. Each of the plurality of resources 210 to 230 may execute execution data received from a corresponding compiler to perform calculation on a subgraph. Each of the plurality of resources 210 to 230 may perform a corresponding calculation using the execution data to generate a calculation result. The task manager 120 may output a plurality of polling signals (for example, first to $n^{th}$ polling signals) PS1 to PSn to the plurality of resources 210 to 230 to poll the calculation result.

Herein, polling may denote that a control device (for example, the model processor 100) inquires a terminal device (for example, the plurality of resources 210 to 230) about the presence of a signal which is to be transmitted and, when there is a signal which is to be transmitted, issues a command to start transmission. In an embodiment, the model processor 100 may output the polling signals PS1 to PSn to the plurality of resources 210 to 230 to inquire about whether there is a transmission request for a calculation result. When each of the plurality of resources 210 to 230 completes calculations and thus there is a transmission request, the model processor 100 may command the plurality of resources 210 to 230 to start transmission, thereby polling a calculation result. The plurality of resources 210 to 230 may transmit the calculation result to the model processor 100 based on polling by the model processor 100.

The model processor 100 may predict a polling time for the plurality of resources 210 to 230 by performing a calculation corresponding to the execution data and may poll a calculation result from each of the plurality of resources 210 to 230 based on the predicted polling time to poll the calculation result at an accurate time.

The model processor 100 may further include an operating system (OS) for driving the model analyzer 110, the task manager 120, and the plurality of compilers 130. The OS may include various kinds of mobile OSs, online OSs, offline OSs. and the like. In an embodiment, the OS may be implemented with Linux, Linux-based Android. Windows, iOS, Mac OS, Chromium OS, or the like.

Figure 2:
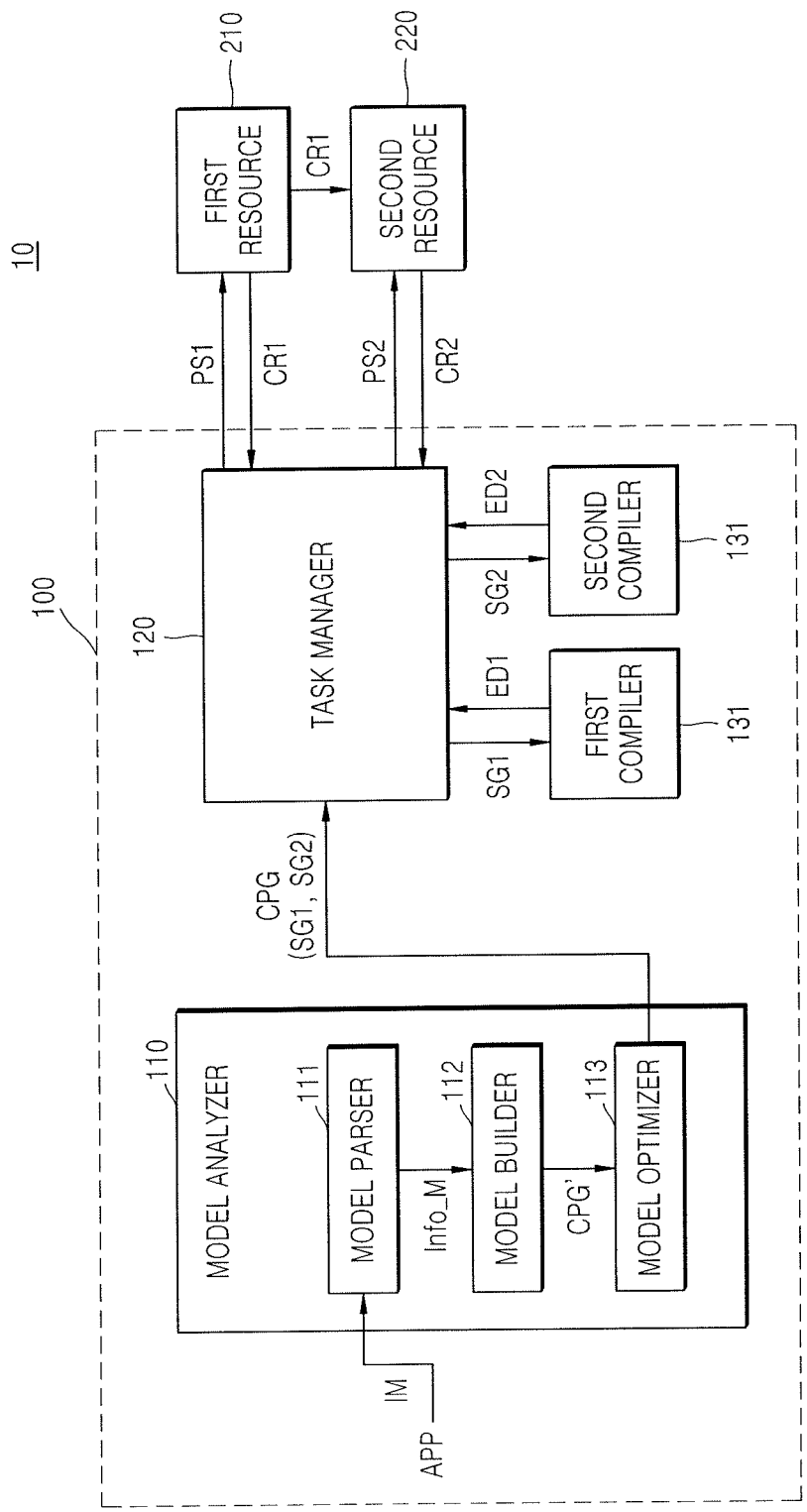
FIG. 2 illustrates a neural network system according to an exemplary embodiment.

FIG. 2 illustrates a neural network system 10 according to an exemplary embodiment. Descriptions similar to or the same as those given above with reference to FIG. 1 are not repeated.

Referring to FIG. 2, the neural network system 10 may include the model processor 100, the first resource 210, and the second resource 220. The model processor 100 may include the model analyzer 110, the task manager 120, a first compiler 131, and a second compiler 132. Also, the model analyzer 110 may include a model parser 111, a model builder 112, and a model optimizer 113. In FIG. 2, an example where two resources, e.g., the first and second resources 210 and 220, and two compilers, e.g., the first and second compilers 131 and 132, are included in the neural network system 10 is illustrated, fewer or more compilers may be included in the neural network system 10.

The model parser 111 may parse an input model IM received from an application APP to generate model information Info_M. The input model IM may include request information for performing instructions programmed in the application APP by using a neural network, and parsing may denote a process of analyzing a grammatical configuration or a sentence structure of the input model IM. In an embodiment, the model information Info_M may include metadata including size information about the input model IM.

The model builder 112 may generate a calculation processing graph CPG' from the input model IM, based on the model information Info_M received from the model parser 111. The calculation processing graph CPG' may denote a graph configured with a plurality of calculation nodes.

The model optimizer 113 may perform an optimization operation on the calculation processing graph CPG' and may output a calculation processing graph CPG, generated as an optimization operation result, to the task manager 120. The optimization operation may denote an operation of minimizing and maximizing the number of calculations of the calculation processing graph CPG'. In an embodiment, the optimization operation may include a graph replacement operation of replacing at least a portion of the calculation processing graph CPG' with another graph, a graph concatenate operation of concatenating at least a portion of the calculation processing graph CPG', and a graph division operation of dividing at least a portion of the calculation processing graph CPG'.

The model analyzer 110 may divide the optimized calculation processing graph CPG into a plurality of subgraphs including a first subgraph SG1 and a second subgraph SG2 and may output the first subgraph SG1 and the second subgraph SG2 to the task manager 120.

The task manager 120 may respectively allocate a plurality of subgraphs (for example, the first and second subgraphs SG1 and SG2) of the calculation processing graph CPG to a plurality of compilers (for example, the first and second compilers 131 and 132). Each of the first and second compilers 131 and 132 may correspond to one resource, and the task manager 120 may respectively allocate a plurality of subgraphs (e.g., SG1 and SG2) to a plurality of compilers (e.g., the first and second compilers 131 and 132) corresponding to a suitable resource. The task manager 120 may respectively allocate a plurality of subgraphs (e.g., SG1 and SG2) to a plurality of compilers (e.g., the first and second compilers 131 and 132) corresponding to a determined resource.

In the embodiment of FIG. 2, the first compiler 131 may correspond to the first resource 210 and the second compiler 132 may correspond to the second resource 220. That is, the first compiler 131 may compile a received input into a program language used in the first resource 210 and the second compiler 132 may compile a received input into a program language used in the second resource 220.

The task manager 120 may allocate the first subgraph SG1 of the calculation processing graph CPG to the first resource 210 and may allocate the second subgraph SG2 to the second resource 220, based on information about resource ability. The task manager 120 may output the first subgraph SG1, allocated to the first resource 210, to the first compiler 131 corresponding to the first resource 210 and may output the second subgraph SG2, allocated to the second resource 220, to the second compiler 132 corresponding to the second resource 220. The first compiler 131 may compile the first subgraph SG1 so as to be driven in the first resource 210, thereby generating first execution data ED1. The second compiler 132 may compile the second subgraph SG2 so as to be driven in the second resource 220, thereby generating second execution data ED2.

The task manager 120 may transmit the first execution data ED1 to the first resource 210 and may transmit the second execution data ED2 to the second resource 220. The first resource 210 may perform a first calculation operation corresponding to the first subgraph SG1 based on the first execution data ED1 and the second resource 220 may perform a second calculation operation corresponding to the second subgraph SG2 based on the second execution data ED2.

According to an embodiment, the task manager 120 may predict a first polling time for which the first resource 210 performs the first calculation operation and may predict a second polling time for which the second resource 220 performs the second calculation operation. In an embodiment, the task manager 120 may assign information corresponding to each of the first and second subgraphs SG1 and SG2 into a predetermined equation to calculate a polling time. In an embodiment, the information corresponding to each of the first and second subgraphs SG1 and SG2 may include size information about the input model IM, size information about each of the first and second subgraphs SG1 and SG2, size information about each of the first and second execution data ED1 and ED2, and a time for which the first and second compilers 131 and 132 perform compiling.

In an embodiment, the task manager 120 may assign the size information about the input model IM into a predetermined equation to calculate the first polling time. In an embodiment, the task manager 120 may assign height information and width information about the first subgraph SG1 into a predetermined equation to calculate the first polling time. In an embodiment, the task manager 120 may assign a data length of the first execution data ED1, obtained by compiling the first subgraph SG1, into a predetermined equation to calculate the first polling time. In an embodiment, the task manager 120 may assign a time, taken for which the first compiler 131 compiles the first subgraph SG1, into a predetermined equation to calculate the first polling time.

The task manager 120 may output the first polling signal PS1 to the first resource 210 based on the calculated first polling time and may output the second polling signal PS2 to the second resource 220 based on the calculated second polling time.

In an embodiment, the task manager 120 may output the first polling signal PSI to the first resource 210 after the first polling time elapses from a time when the first execution data ED1 is output to the first resource 210. The first polling time may have a value obtained by predicting a time taken in performing the first calculation operation corresponding to the first subgraph SG1. Thus, the first resource 210 may output a first calculation result to the task manager 120 based on the first polling signal PS1.

In an embodiment, the task manager 120 may output the second polling signal PS2 to the second resource 220 after the first polling time and the second polling time elapse from the time when the first execution data ED1 is output to the first resource 210. In an embodiment, the task manager 120 may output the second polling signal PS2 to the second resource 220 after the first polling time and the second polling time elapse, for obtaining a second calculation result by successively performing the first calculation operation corresponding to the first subgraph SG1 and the second calculation operation corresponding to the second subgraph SG2. The first polling time may have a value obtained by predicting a time for which the first resource 210 performs the first calculation operation, and the second polling time may have a value obtained by predicting a time for which the second resource 220 performs the second calculation operation. Accordingly, the second resource 220 may output the second calculation result based on the first and second calculation operations to the task manager 120 based on the second polling signal PS2.

Figure 3:
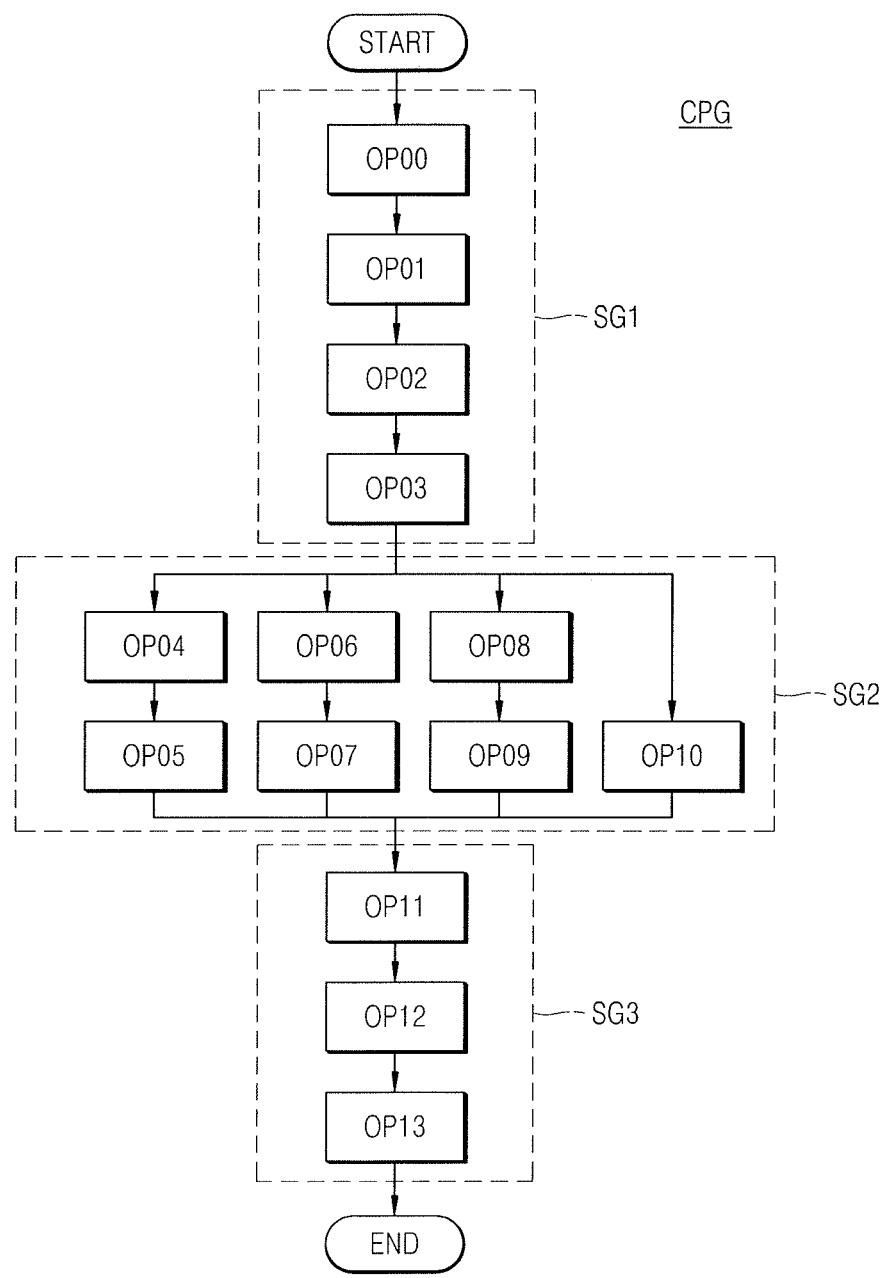
FIG. 3 illustrates a calculation processing graph according to an exemplary embodiment.

FIG. 3 is a diagram showing a calculation processing graph according to an exemplary embodiment. Referring to FIGS. 1 and 3, the model analyzer 110 may analyze the input model IM to generate a calculation processing graph including first to fourteenth sub-calculations OP00 to OP13. Each of the first to fourteenth sub-calculations OP00 to OP13 may represent one of various kinds of mathematical operations (e.g., a convolution operation, a correction linear unit operation, a memory copy operation, etc.) and may be the same calculations or different calculations.

The model analyzer 110 may divide the generated calculation processing graph CPG into a plurality of subgraphs (e.g., first to third subgraphs) SG1 to SG3, based on the kind of calculation, a calculation preference, and a shape of a graph. In the embodiment of FIG. 3, the model analyzer 110 may classify the first to fourth sub-calculations OP00 to OP03 as the first subgraph SG1, may classify the fifth to eleventh sub-calculations OP04 to OP10 as the second subgraph SG1, and may classify the twelfth to fourteenth sub-calculations OP11 to OP13 as the third subgraph SG3.

The task manager 120 may receive the calculation processing graph CPG including the first to third subgraphs SG1 to SG3 and may respectively allocate the first to third subgraphs SG1 to SG3 to a plurality of resources. In an embodiment, the task manager 120 may allocate each of the first to third subgraphs SG1 to SG3 to a suitable resource, based on hardware abilities of the plurality of resources.

In an embodiment, the task manager 120 may allocate the first and third subgraphs SG1 and SG3 to a first resource (e.g., an NPU) and may allocate the second subgraph SG2 to a second resource (e.g., a GPU). In another embodiment, the task manager 120 may allocate the first subgraph SG1 to the first resource (e.g., an NPU), allocate the second subgraph SG2 to the second resource (e.g., a GPU), and allocate the third subgraph SG3 to a third resource (e.g., a CPU).

The task manager 120 may output the first to third subgraphs SG1 to SG3 to the first and second compilers 131 and 132 corresponding to a resource to which a corresponding subgraph is allocated, and the first and second compilers 131 and 132 may compile the first to third subgraphs SG1 to SG3 received thereby to generate pieces of execution data. Also, the task manager 120 may calculate a polling time based on information corresponding to each of the first to third subgraphs SG1 to SG3 and may output a polling signal to a corresponding resource based on the calculated polling time.

Figure 4:
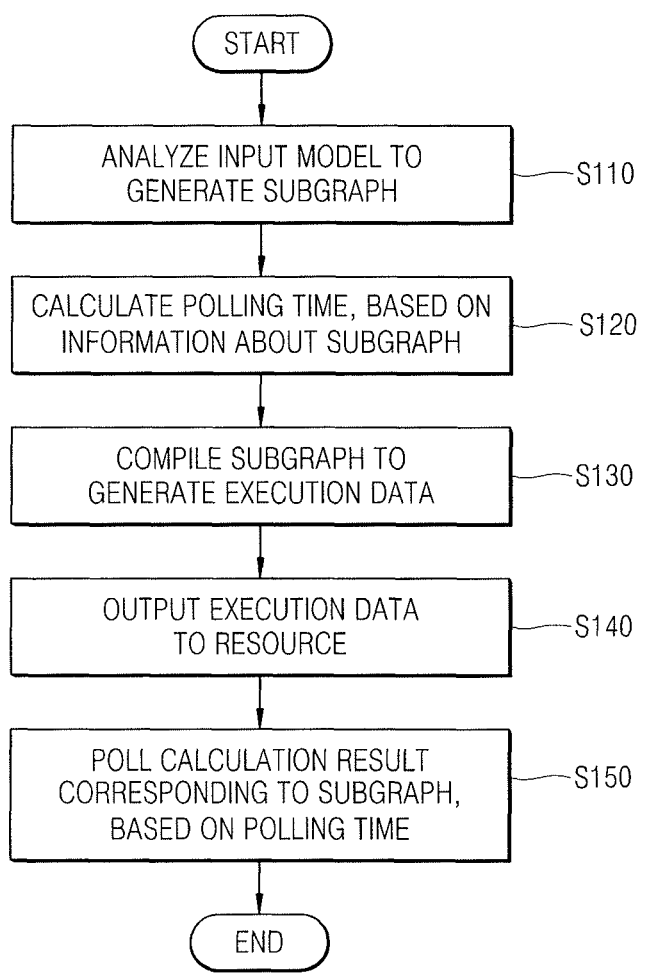
FIG. 4 illustrates a flowchart of an operating method of a model processor according to an exemplary embodiment.

FIG. 4 is a flowchart illustrating an operating method of a model processor according to an exemplary embodiment. Referring to FIGS. 2 and 4, the model processor 100 may analyze an input model IM to generate subgraphs SG1 and SG2 in operation S110 and may calculate a polling time based on information corresponding to each of the subgraphs SG1 and SG2 in operation S120. The model processor 100 may compile the subgraphs SG1 and SG2 to generate pieces of execution data ED1 and ED2 in operation S130. The model processor 100 may output the pieces of execution data ED1 and ED2 to the first and second resources 210 and 220 corresponding thereto in operation S140 and may poll calculation results, corresponding to the subgraphs SG1 and SG2, from the first and second resources 210 and 220 based on the calculated polling time in operation S150.

Figure 5:
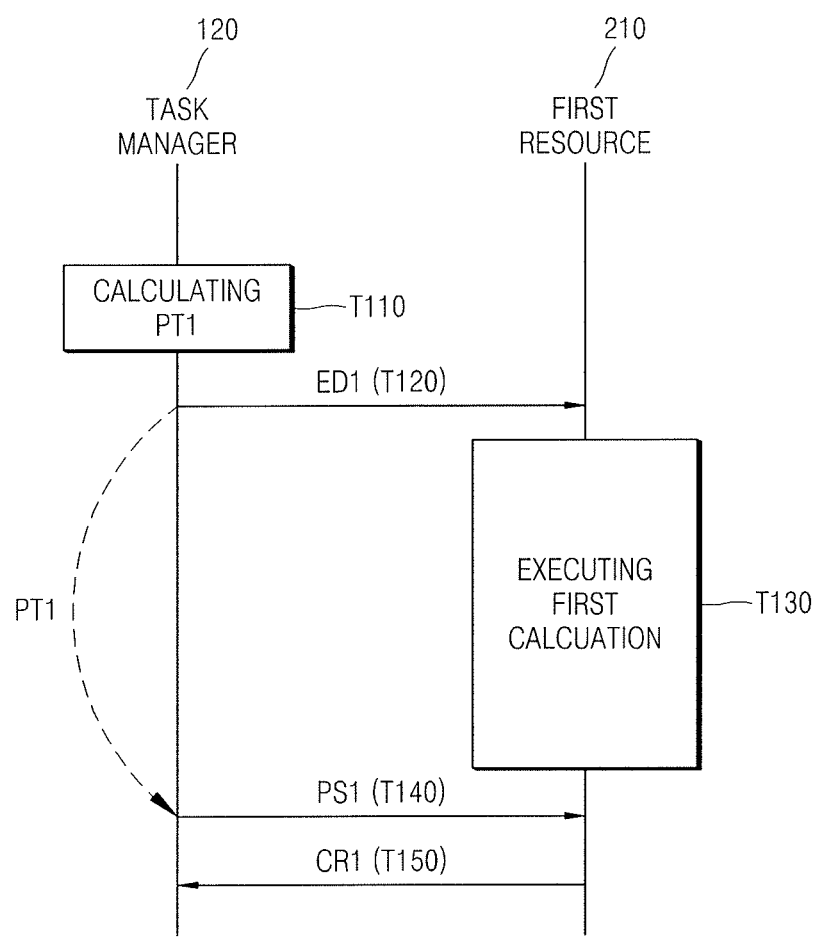
FIG. 5 illustrates an operation of a neural network system according to an exemplary embodiment.

FIG. 5 is a diagram illustrating an operation of a neural network system according to an exemplary embodiment. In detail, FIG. 5 is a diagram illustrating an example where one resource, e.g., the first resource 210, performs calculation over time.

Referring to FIG. 5, a task manager 120 may calculate a first polling time PT1 based on information corresponding to a first subgraph in operation TI 10. The task manager 120 may output first execution data ED1 generated by compiling the first subgraph, to a first resource 210 in operation T120. The first resource 210 may perform a first calculation operation corresponding to the first subgraph based on the first execution data ED1 in operation T130. The task manager 120 may output a first polling signal PS1 to the first resource 210 after a first polling time PT1 elapses from a time when the first execution data ED1 is output to the first resource 210 in operation T140. The first resource 210 may receive the first polling signal PS1 after the first calculation operation ends and, thus, may output a first calculation result CR1 to the task manager 120 based on the first polling signal PS1 in operation T150.

Figure 6:
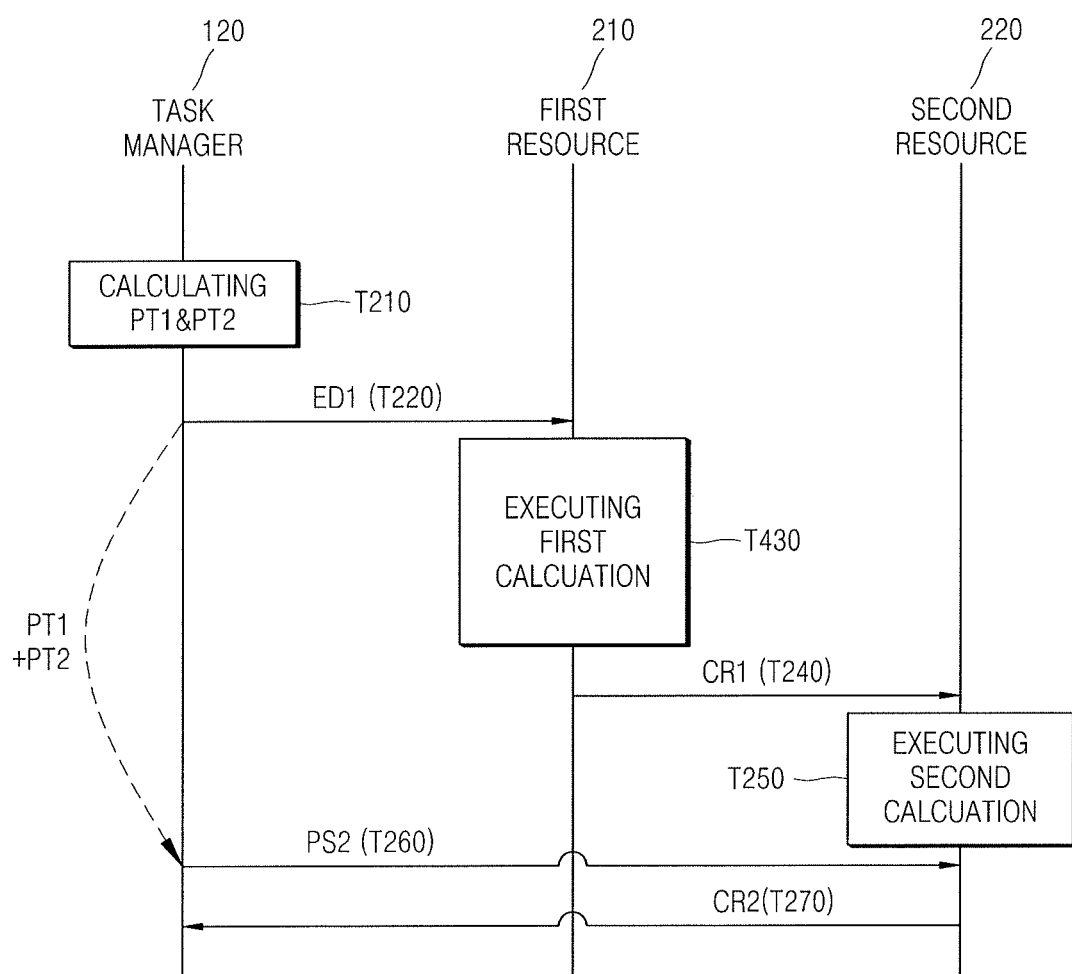
FIG. 6 illustrates an operation of a neural network system according to an exemplary embodiment.

FIG. 6 is a diagram illustrating an operation of a neural network system according to an exemplary embodiment. In detail, FIG. 6 is a diagram illustrating an example where two resources, e.g., the first and second resources 210 and 220, perform successive calculations over time.

Referring to FIG. 6, the task manager 120 may calculate a first polling time PT1 based on information corresponding to a first subgraph and may calculate a second polling time PT2 based on information corresponding to a second subgraph in operation T210. The task manager 120 may output first execution data ED1, generated by compiling the first subgraph, to the first resource 210 in operation T220. The first resource 210 may perform a first calculation operation corresponding to the first subgraph based on the first execution data ED1 in operation T230. The first resource 210 may output a first calculation result CR1, generated by performing the first calculation operation, to the second resource 220 in operation T240.

The second resource 220 may perform a second calculation operation corresponding to the second subgraph based on the first calculation result CR1 and second execution data ED2 in operation T250. To this end, the second resource 220 may further receive the second execution data ED2 from the task manager 120.

The task manager 120 may output a second polling signal PS2 to the second resource 220 after the first polling time PT1 and the second polling time PT2 elapse from the time when the first execution data ED1 is output to the first resource 210 in operation T260. The second resource 220 may receive the second polling signal PS2 after the second calculation operation ends and, thus, may output a second calculation result CR2 based on the first and second calculation operations to the task manager 120 based on the second polling signal PS2 in operation T270.

Figure 7:
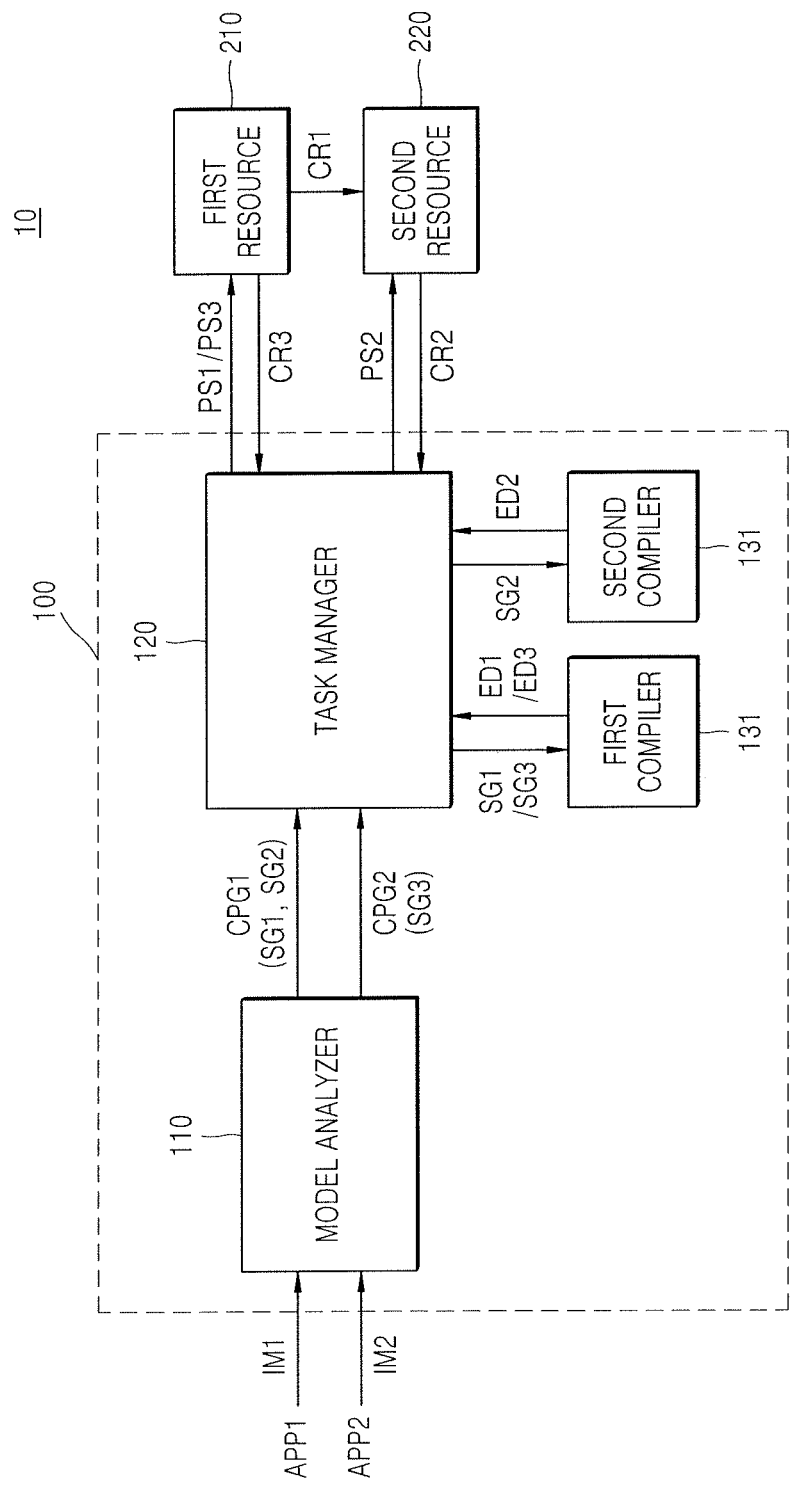
FIG. 7 illustrates a neural network system according to an exemplary embodiment.

FIG. 7 illustrates a neural network system 10 according to an exemplary embodiment. In detail, FIG. 7 illustrates an example where a plurality of input models IM1 and IM2 are received from one or more applications APP1 and APP2. Descriptions similar to or the same as those given above with reference to FIG. 2 are not repeated.

Referring to FIG. 7, the neural network system 10 may include the model processor 100, the first resource 210, and the second resource 220. The model processor 100 may include the model analyzer 110, the task manager 120, the first compiler 131, and the second compiler 132. Also, the model analyzer 110 may receive a first input model IM1 from a first application APP1 and may receive a second input model IM2 from a second application APP2.

The model analyzer 110 may analyze the first input model IM1 to generate a first calculation processing graph CPG1 including first and second subgraphs SG1 and SG2 and may analyze the second input model IM2 to generate a second calculation processing graph CPG2 including a third subgraph SG3. A method of generating, using the model analyzer 110, the first calculation processing graph CPG1 and the second calculation processing graph CPG2 has been described above with reference to FIG. 2, and is not repeated.

The task manager 120 may allocate the first and third subgraphs SG1 and SG3 to the first resource 210 and may output the first and third subgraphs SG1 and SG3 to a first compiler 131 corresponding to the first resource 210. The first compiler 131 may compile the first subgraph SG1 to generate first execution data ED1 and may compile the third subgraph SG3 to generate third execution data ED3.

The task manager 120 may allocate the second subgraph SG2 to the second resource 220 and may output the second subgraph SG2 to a second compiler 132 corresponding to the second resource 220. The second compiler 132 may compile the second subgraph SG2 to generate second execution data ED2.

The task manager 120 may output the first execution data ED1 and the third execution data ED3 to the first resource 210 and may output the second execution data ED2 to the second resource 220. The first resource 210 and the second resource 220 may operate based on one of a blocking manner and a non-blocking manner. The blocking manner may denote a method where calculation corresponding to one calculation processing graph (e.g., a first calculation processing graph CPG1) is completely performed and then calculation corresponding to another calculation processing graph (e.g., a second calculation processing graph CPG2) is performed. The non-blocking manner may denote a method where, although calculation corresponding to one calculation processing graph is not completely performed, calculation corresponding to another calculation processing graph is performed within a range which allows calculation processing ability of a resource.

In the embodiment of FIG. 7, according to the blocking manner, the first resource 210 may not perform calculation corresponding to the third subgraph SG3 until before the second resource 220 completes calculation corresponding to the second subgraph SG2 included in the first calculation processing graph CPG1. On the other hand, according to the non-blocking manner, the first resource 210 may perform calculation corresponding to the third subgraph SG3 even before the second resource 220 completes calculation corresponding to the second subgraph SG2. This will be described below with reference to FIGS. 8 and 9.

The task manager 120 may calculate a first polling time based on information corresponding to the first subgraph SG1, calculate a second polling time based on information corresponding to the second subgraph SG2, and calculate a third polling time based on information corresponding to the third subgraph SG3.

In an embodiment, the task manager 120 may output the second polling signal PS2 to the second resource 220 after the first polling time and the second polling time elapse from a time when the first execution data ED1 is output to the first resource 210, thereby polling a calculation result from the second resource 220. Accordingly, the task manager 120 may obtain a calculation result corresponding to the first calculation processing result CPG1.

In an embodiment, when calculation is performed based on the blocking manner, the task manager 120 may output a third polling signal PS3 to the first resource 210 after a third polling time elapses from a time when the second resource 220 completes calculation on the second execution data ED2, thereby polling a calculation result from the first resource 210. Therefore, the task manager 120 may obtain a calculation result corresponding to the second calculation processing result CPG2. This will be described below with reference to FIG. 8.

In an embodiment, when calculation is performed based on the non-blocking manner, the task manager 120 may output the third polling signal PS3 to the first resource 210 after the third polling time elapses from a time when the first resource 210 completes calculation on the first execution data ED1, thereby polling a calculation result from the first resource 210. Therefore, the task manager 120 may obtain a calculation result corresponding to the second calculation processing result CPG2. This will be described below with reference to FIG. 9.

In FIG. 7, an embodiment where a plurality of input models IM1 and IM2 are received from different applications APP1 and APP2 is illustrated, but a plurality of input models may be received from one application or more than two applications may be used.

Figure 8:
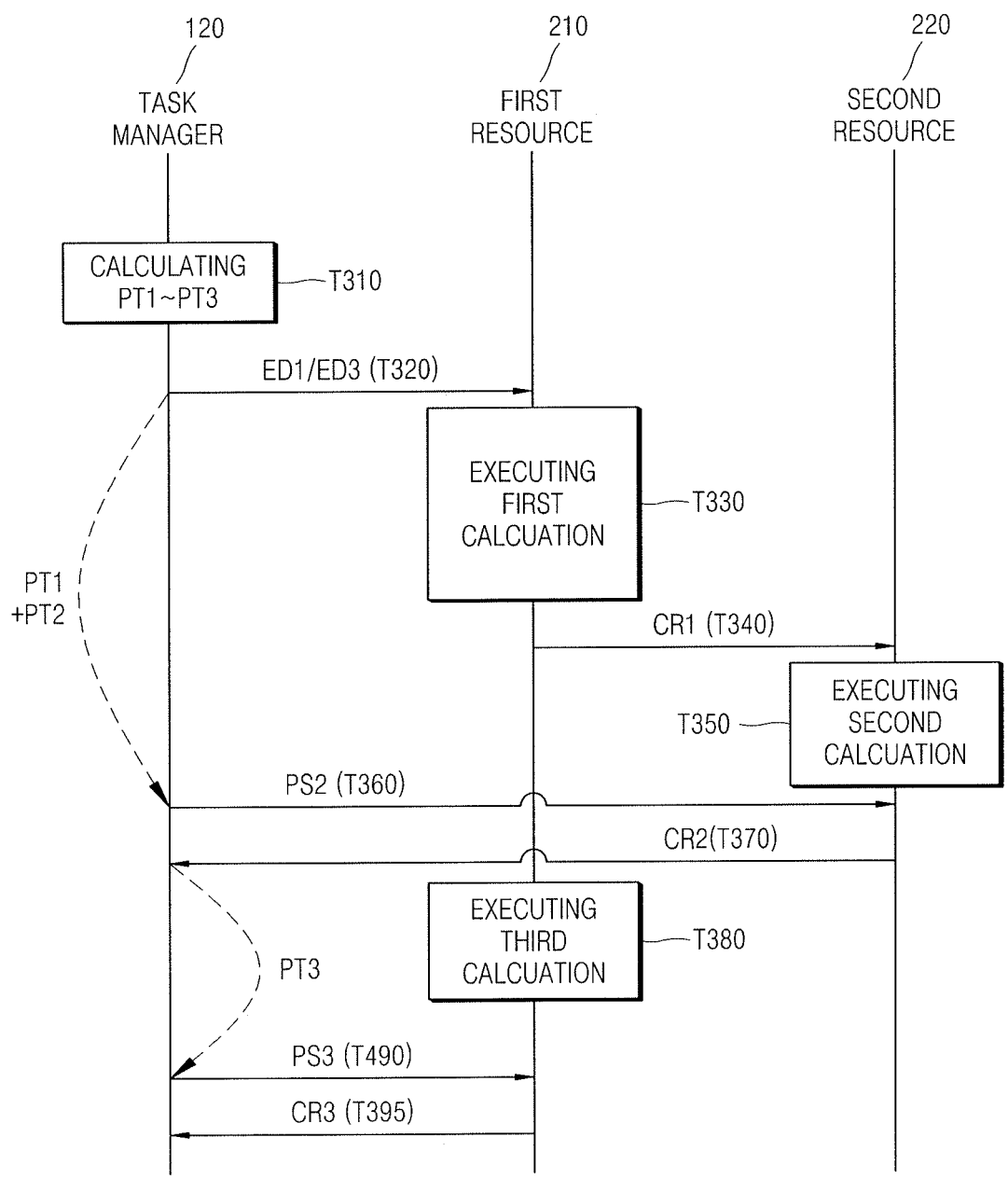
FIG. 8 illustrates an operation of a neural network system according to an exemplary embodiment.

FIG. 8 is a diagram illustrating an operation of a neural network system according to an exemplary embodiment. In detail, FIG. 8 is a diagram illustrating an example where two resources, e.g., the first and second resources 210 and 220, perform calculation corresponding to a plurality of input models over time, based on the blocking manner.

Referring to FIGS. 7 and 8, the task manager 120 may calculate a first polling time PT1 based on information corresponding to a first subgraph SG1, calculate a second polling time PT2 based on information corresponding to a second subgraph SG2, and calculate a third polling time PT3 based on information corresponding to a third subgraph SG3 in operation T310. In the embodiment of FIG. 8, the first subgraph SG1 and the second subgraph SG2 may be included in a first calculation processing graph CPG1 corresponding to a first input model IM1, and the third subgraph SG3 may be included in a second calculation processing graph CPG2 corresponding to a second input model IM2.

The task manager 120 may simultaneously or sequentially output, to the first resource 210, first execution data ED1 generated by compiling the first subgraph SG1 and third execution data ED3 generated by compiling the third subgraph SG3 in operation T320. The first resource 210 may perform a first calculation operation corresponding to the first subgraph SG1 based on the first execution data ED1 in operation T330. The first resource 210 may output a first calculation result CR1, generated by performing the first calculation operation, to the second resource 220 in operation 1340.

The second resource 220 may perform a second calculation operation corresponding to the second subgraph SG2 based on the first calculation result CR1 and second execution data ED2 in operation T350. To this end, although not shown, the second resource 220 may further receive the second execution data ED2 from the task manager 120.

The task manager 120 may output a second polling signal PS2 to the second resource 220 after the first polling time PT1 and the second polling time PT2 elapse from a time when the first execution data ED1 is output to the first resource 210 in operation T360. The second resource 220 may receive the second polling signal PS2 after the second calculation operation ends, and thus, may output a second calculation result CR2 based on the first and second calculation operations to the task manager 120 based on the second polling signal PS2 in operation 1370.

According to the blocking manner, the first resource 210 may not perform a third calculation operation based on the third execution data ED3 until the second calculation operation of the second resource 220 is completed. Therefore, in operation T380, the first resource 210 may perform the third calculation operation based on the third execution data ED3 after the second calculation operation of the second resource 220 is completed.

In operation T390, the task manager 120 may output a third polling signal PS3 to the first resource 210 after the third polling time PT3 elapses from a time when the second calculation result CR2 based on the second calculation operation is received. The first resource 210 may receive the third polling signal PS3 after the third calculation operation is completed, and thus, may output a third calculation result CR3 based on the third calculation operation to the task manager 120 based on the third polling signal PS3 in operation T395.

Figure 9:
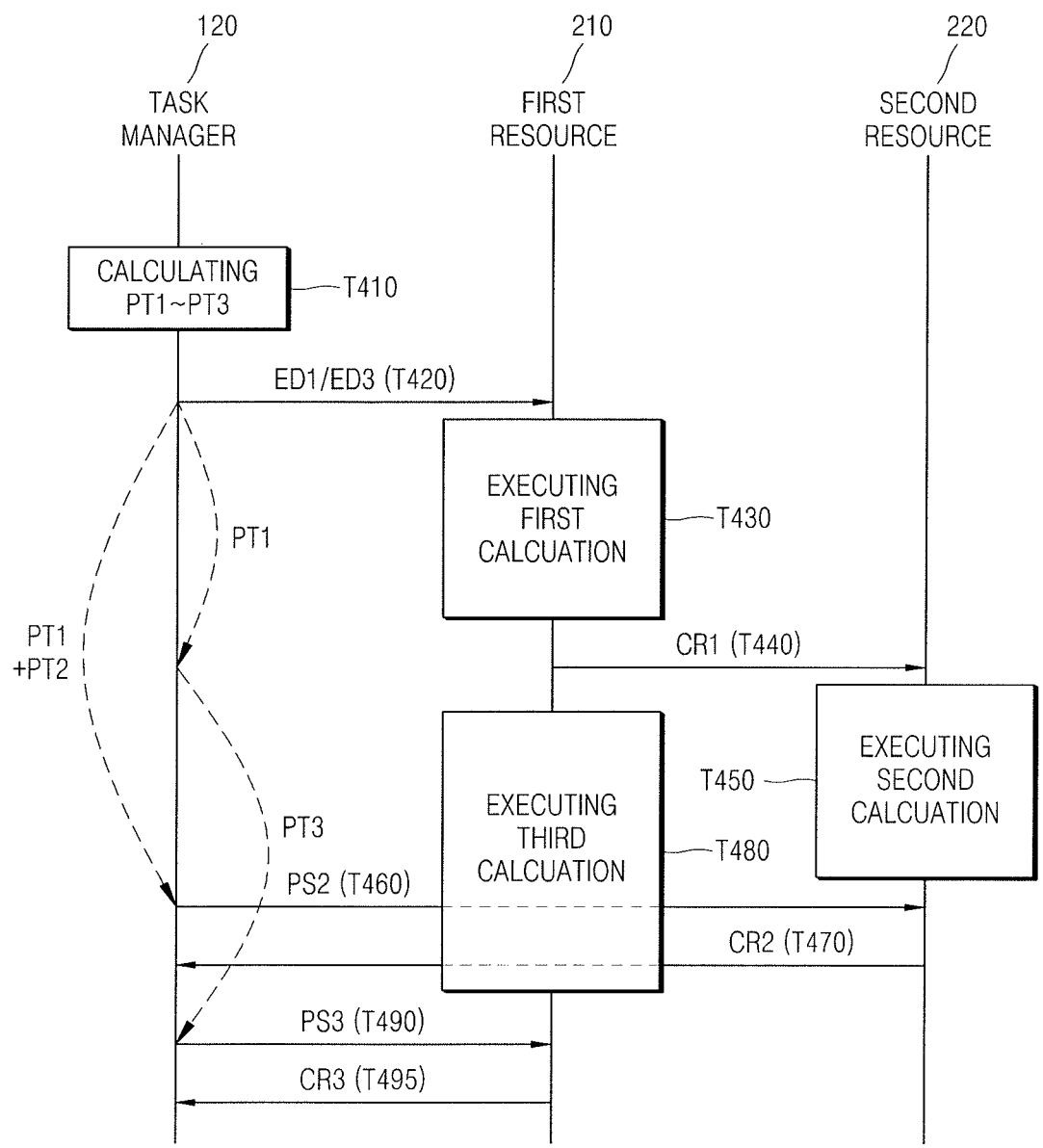
FIG. 9 illustrates an operation of a neural network system according to an exemplary embodiment.

FIG. 9 is a diagram illustrating an operation of a neural network system according to an exemplary embodiment. In detail, FIG. 9 is a diagram illustrating an example where two resources, e.g., the first and second resources 210 and 220, perform calculation corresponding to a plurality of input models over time, based on the non-blocking manner.

Referring to FIG. 9, operations T410 to T470 may be the same as or similar to operations T310 to T370 of FIG. 8, and thus, their descriptions are not repeated. According to the non-blocking manner, a first resource 210 may perform a third calculation operation based on third execution data ED3 even before a second calculation operation of a second resource 220 is completed. Therefore, in operation T480, the first resource 210 may perform the third calculation operation based on the third execution data ED3 immediately after a first calculation operation based on first execution data ED1 is completed.

A task manager 120 may determine that a time after a first polling time PT1 elapses from a time when the first execution data ED1 is output is a time when the first calculation operation is completed, and thus, may output a third polling signal PS3 to the first resource 210 after the first polling time PT1 and a third polling time PT3 elapse from a time when the first execution data ED1 is output in operation T490. The first resource 210 may receive a second polling signal PS2 after the third calculation operation is completed, and thus, may output a third calculation result CR3 based on the third calculation operation to the task manager 120 based on the third polling signal PS3 in operation T495.

Figure 10A:
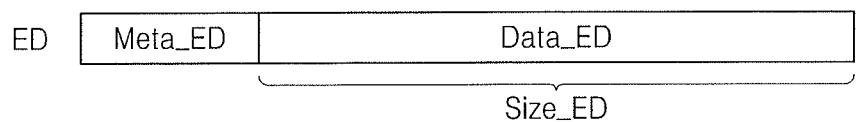
FIGS. 10A and 10B illustrate diagrams for describing a polling time calculation method according to an exemplary embodiment.
Figure 10B:
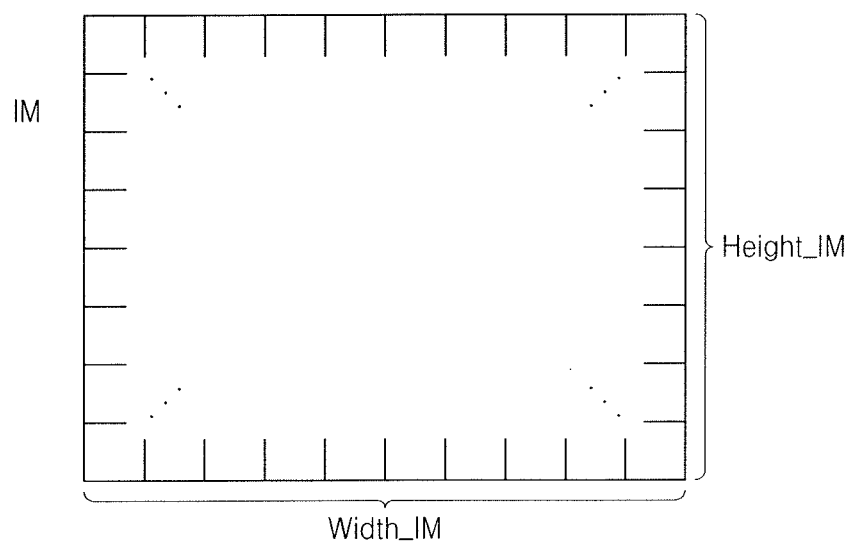

FIGS. 10A and 10B are diagrams for describing a polling time calculation method according to an exemplary embodiment. In detail, FIGS. 10A and 10B are diagrams for describing a method of calculating a polling time by using a predetermined equation.

Referring to FIG. 10A, execution data ED may include a meta region Meta_ED and a data region Data_ED, and the meta region Meta_ED may include size information Size_ED about the data region Data_ED. When the size information Size_ED is S and a resource (e.g., an NPU, a GPU, or a CPU) constant is C1, a polling time PT1(S) according to an embodiment in association with an integer n may be determined as the following Equation (1):

$$PT1(S)=C1 \times S^n \qquad (1)$$

Referring to FIG. 10B, in an embodiment, an input model IM using a CNN may have a width Width_IM and a height Height_IM. When the width Width_IM of the input model IM is W, the height Height_IM of the input model IM is H, and a resource constant is C2, a polling time PT2(W, H) according to an embodiment may be determined as the following Equation (2):

$$PT2(W,H)=C2 \times W \times H \qquad (2)$$

Moreover, when a time for which a compiler compiles a subgraph is T and a resource constant is C3, a polling time PT3(T) according to an embodiment may be determined as the following Equation (3):

$$PT3(T)=C3 \times T \qquad (3)$$

The Equations are merely an embodiment and may be applied to an embodiment where a polling time is calculated by assigning information (e.g., a size of execution data, a size of an input model, a size of a subgraph, a compiling time, etc.) corresponding to a subgraph into a predetermined equation.

FIG. 11 is a table showing a calculation processing table according to an exemplary embodiment. In detail, FIG. 11 is a diagram for describing a method of calculating a polling time by using calculation processing ability of a resource.

Referring to FIG. 11, a resource may provide a calculation processing table CPC_RS including information about predetermined calculation processing ability of the resource. The calculation processing table CPC_RS may include information about a time taken in calculation-based processing. Calculation may include a convolution operation, a correction linear unit operation, a memory copy operation, a concatenate operation, and the like.

In the embodiment of FIG. 11, in the resource, a first time t1 may be taken in processing a first sub-calculation OP1 having a first size Size1 and a second time t2 may be taken in processing a second sub-calculation OP2 having a second size Size2. Also, in the resource, a third time t3 may be taken in processing the second sub-calculation OP2 and a fourth time t4 may be taken in processing a third sub-calculation OP3.

A task manager according to an embodiment may calculate a polling time corresponding to a subgraph based on the calculation processing table CPC_RS. In an embodiment, when the subgraph includes n number of first sub-calculations OP1 having the first size Size1 and m number of second sub-calculations OP2, the task manager may calculate n*t1+m*t3 as a polling time.

Figure 12:
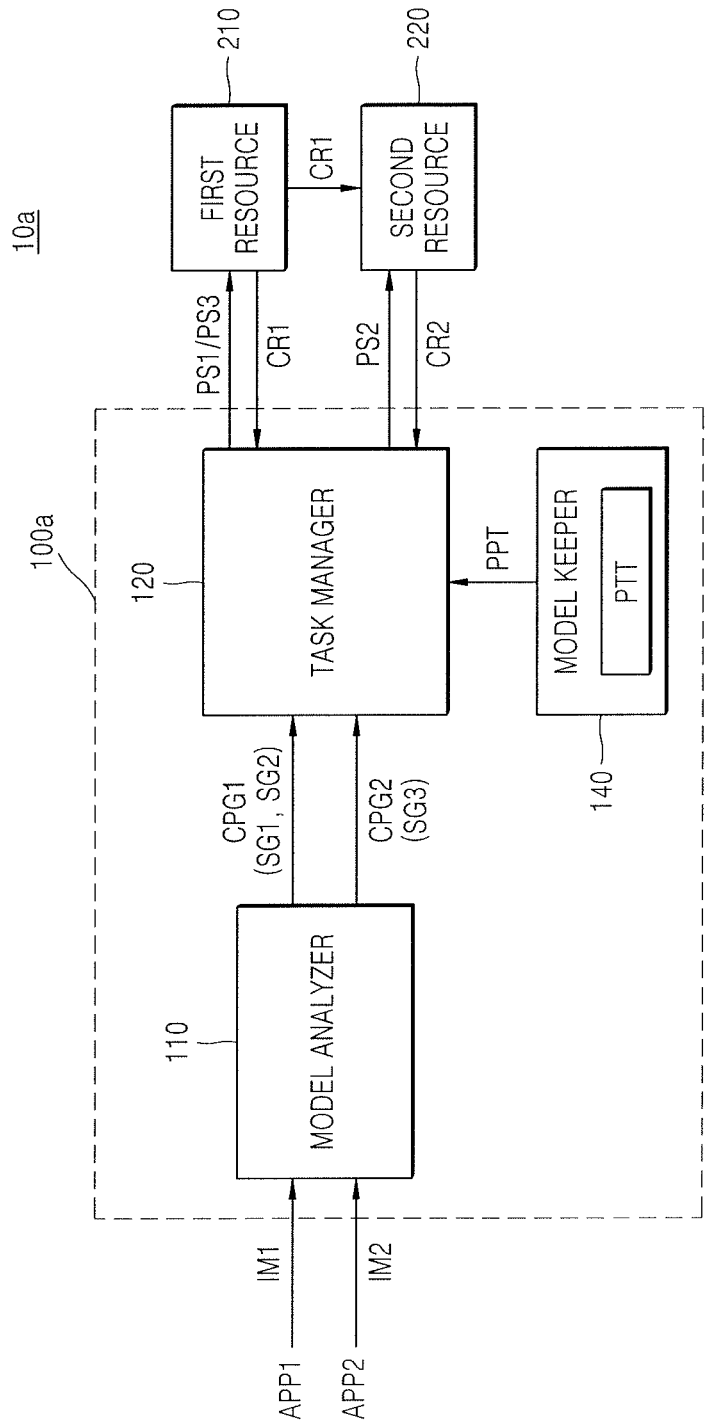
FIG. 12 illustrates a neural network system according to an exemplary embodiment.

FIG. 12 illustrates a neural network system 10a according to an exemplary embodiment. Descriptions which are similar to or the same as descriptions given above with reference to FIG. 2 are not repeated.

Referring to FIG. 12, the neural network system 10a may include a model processor 100a, the first resource 210, and the second resource 220. The model processor 100a may include the model analyzer 110, the task manager 120, and a model keeper 140.

The model keeper 140 may store a polling timetable PTT including information about a polling time for each of subgraphs (e.g., first to third subgraphs) SG1 to SG3. To this end, the model keeper 140 may include at least one of a volatile memory and a non-volatile memory. The non-volatile memory may include flash memory, phase-change random access memory (PRAM), magnetic random access memory (MRAM), resistive random access memory (RRAM), ferroelectric random access memory (FRAM), etc., and the volatile memory may include dynamic random access memory (DRAM), static random access memory (SRAM), synchronous DRAM (SDRAM), a latch, a flip-flop, a register, etc.

The task manager 120 may receive the polling timetable PTT and may search for a polling time corresponding to a subgraph in the polling timetable PTT. In an embodiment, the task manager 120 may search for a first polling time corresponding to the first subgraph SG1 in the polling timetable PTT, and when the first polling time is found in the polling timetable PIT, the task manager 120 may output a first polling signal PS1 to a first resource 210 by using the first polling time obtained from the polling timetable PTT.

In an embodiment, the task manager 120 may search for a second polling time corresponding to the second subgraph SG2 in the polling timetable PTT, and when the second polling time is not found in the polling timetable PTT, the task manager 120 may calculate the second polling time through the above-described methods. Also, the task manager 120 may update the polling timetable PTT with the calculated second polling time.

According to an embodiment, the task manager 120 may obtain a polling time by using the polling timetable PTT, thereby preventing undesired calculation and efficiently polling a calculation result.

In an embodiment, the model keeper 140 may store pieces of execution data corresponding to the first to third subgraphs SG1 to SG3 and, in response to a request of each of the first and second resources 210 and 220, the model keeper 140 may output the execution data to a corresponding resource.

In FIG. 12, the model keeper 140 is illustrated as an internal element of the model processor 100a, but may be implemented as a separate element provided outside the model processor 100a. In an embodiment, the model keeper 140 may be implemented with at least one of hard disk drive (HDD), solid state drive (SSD), compact flash (CF), secure digital (SD), micro secure digital (Micro-SD), mini secure digital (Mini-SD), extreme digital (xD), memory stick, and the like. Also, in order to control access to the model keeper 140, the model keeper 140 may include direct memory access (DMA), memory DMA (MDMA), peripheral DMA (PDMA), remote DMA (RDMA), smart DMA (SDMA), etc.

FIG. 13 is a table showing a polling timetable PTT according to an exemplary embodiment. Referring to FIG. 13, the polling timetable PTT may include matching information about subgraphs, resource characteristics (RS Char.), and polling times. The resource characteristics (RS Char.) may be relevant to resource-based driving characteristic, and for example, may include the kinds (e.g., an NPU, a GPU, and a CPU) of resources, a resource driving frequency, and resource driving power.

In the embodiment of FIG. 13, when a calculation operation is performed on a first subgraph SG1 based on a first resource characteristic CH1, a first time t1 may be a polling time, and when a calculation operation is performed on the first subgraph SG1 based on a second resource characteristic CH2, a second time t2 may be a polling time. Also, when a calculation operation is performed on a second subgraph SG2 based on the first resource characteristic CH1, a third time t3 may be a polling time, and when a calculation operation is performed on a third subgraph SG3 based on a third resource characteristic CH3, a fourth time t4 may be a polling time.

Figure 14:
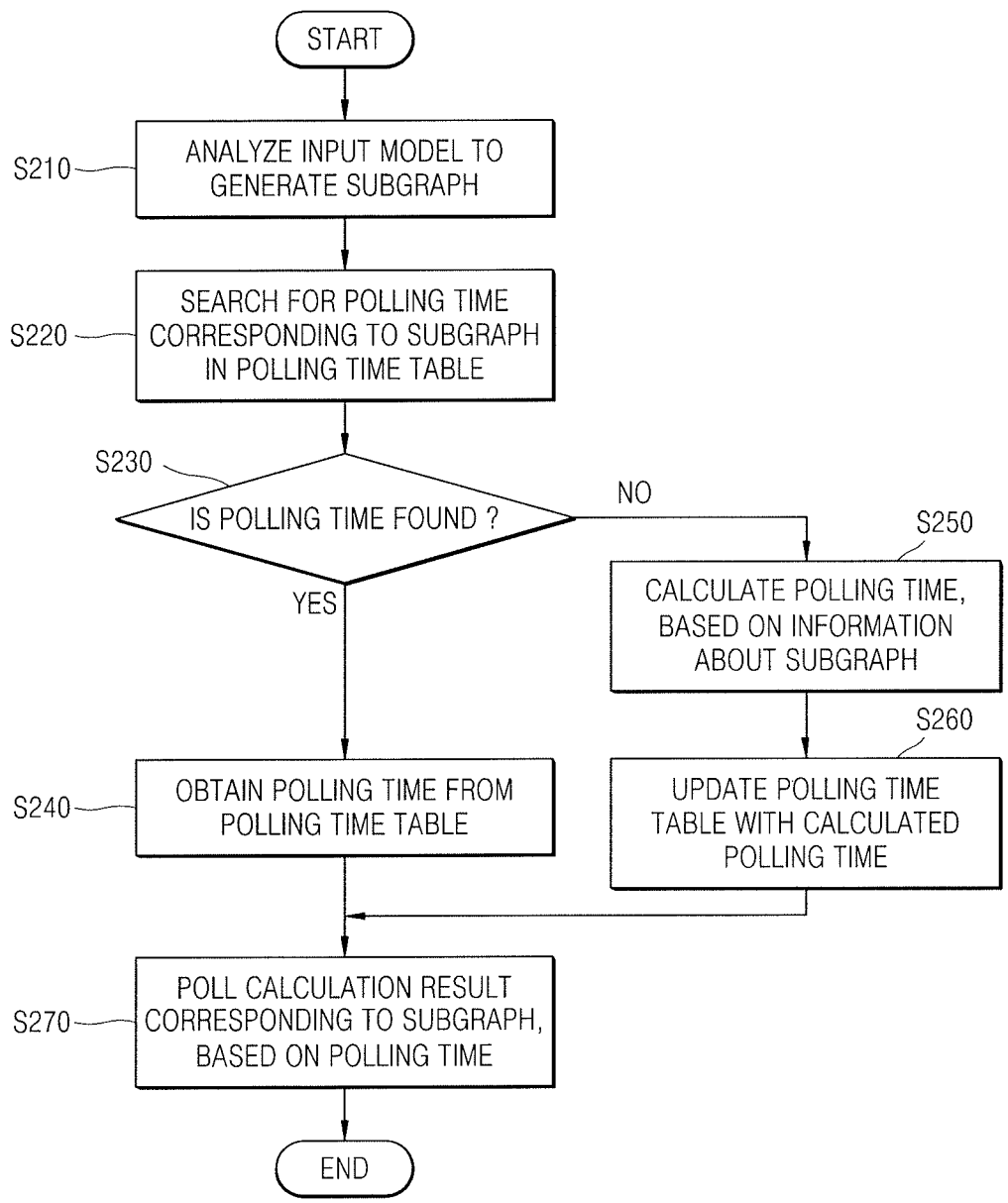
FIG. 14 illustrates a flowchart of an operating method of a model processor according to an exemplary embodiment.

FIG. 14 is a flowchart illustrating an operating method of a model processor 100a according to an exemplary embodiment. In detail, FIG. 14 is an embodiment where the model processor 100a performs polling by using a polling timetable.

Referring to FIGS. 12 and 14, the model processor 100a may analyze a plurality of input models IM1 and IM2 to generate a plurality of subgraphs SG1 to SG3 in operation S210, and may search for a polling time corresponding to each of the subgraphs SG1 to SG3 in a polling timetable PTT in operation S220. When the polling time corresponding to each of the subgraphs SG1 to SG3 is found in the polling timetable PIT in operation S230, the model processor 100a may obtain a polling time from the polling timetable PIT without calculating a polling time in operation S240 and may poll a calculation result corresponding to a subgraph based on the obtained polling time in operation S270.

When the polling time corresponding to each of the subgraphs SG1 to SG3 is not found in the polling timetable PTT in operation S230, the model processor 100a may calculate a polling time based on information about a subgraph in operation S250 and may update the polling timetable PTT with the calculated polling time in operation S260. Also, the model processor 100a may poll a calculation result corresponding to the subgraph based on the calculated polling time in operation S270.

Figure 15:
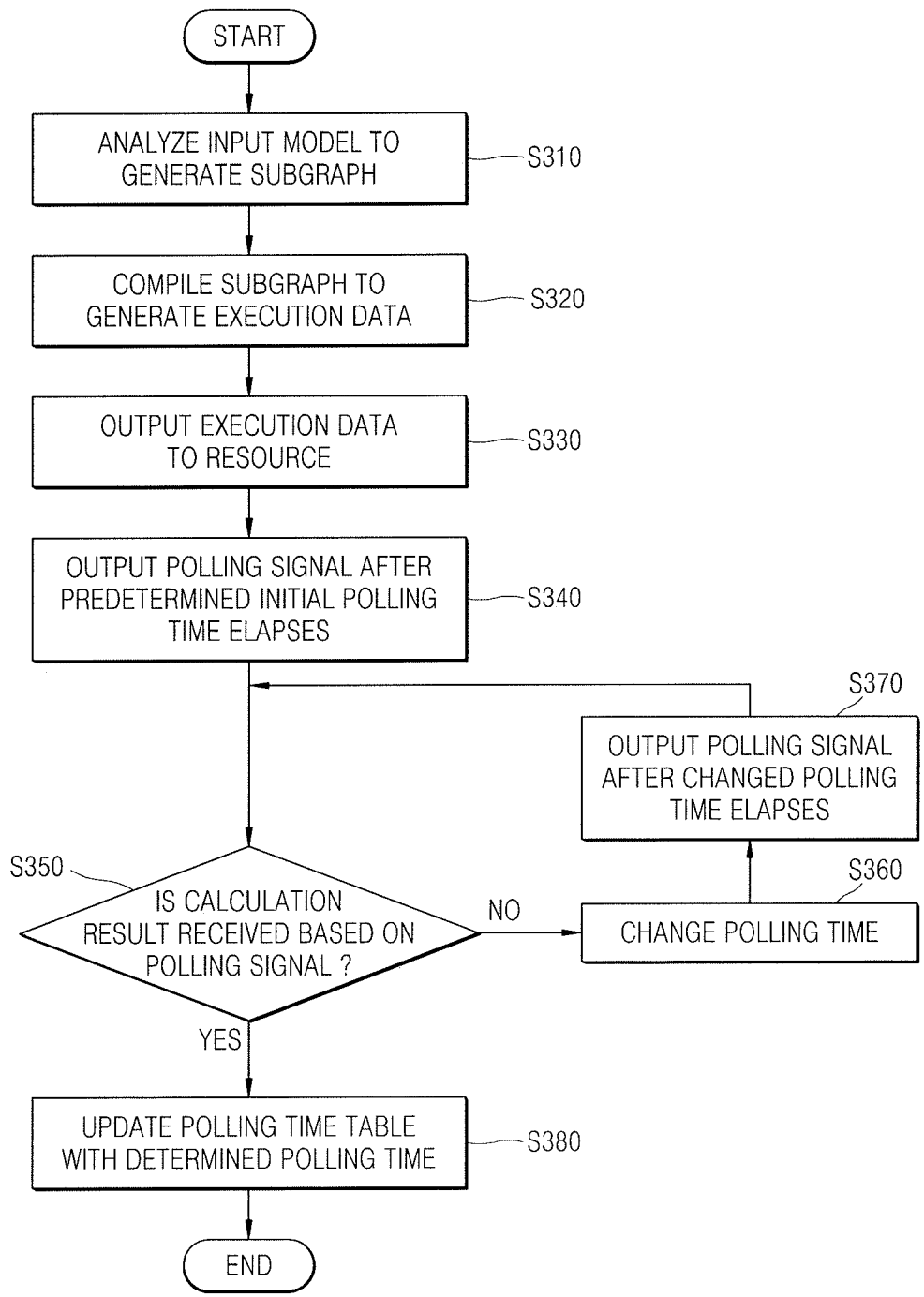
FIG. 15 illustrates a flowchart of an operating method of a model processor according to an exemplary embodiment.

FIG. 15 is a flowchart illustrating an operating method of a model processor 100a according to an exemplary embodiment. In detail, FIG. 15 illustrates an embodiment where the model processor 100a performs polling while adaptively adjusting a polling time.

Referring to FIGS. 12 and 15, the model processor 100a may analyze an input model to generate a plurality of subgraphs SG1 to SG3 in operation S310 and may compile the subgraphs SG1 to SG3 to generate execution data in operation S320. The model processor 100a may output the generated subgraphs SG1 to SG2 to corresponding first and second resources 210 and 220 in operation S330 and may output a polling signal to the first and second resources 210 and 220 after a predetermined initial polling time elapses in operation S340.

When a calculation result is not received from each of the first and second resources 210 and 220 based on a polling signal in operation S350, the model processor 100a may change a polling time in operation S360, and in operation S370, the model processor 100a may re-output the polling signal after a changed polling time elapses. In an embodiment, the changed polling time may be shorter than a previous polling time.

When a calculation result is received from each of the first and second resources 210 and 220 based on a plurality of polling signals PS1 to PS in operation S350, the model processor 100a may update the polling timetable PTT with a polling time when the calculation result is received in operation S380.

The model processor 100a according to an embodiment may output a plurality of polling signals based on different polling times, thereby finding an optimal polling time for a subgraph and enabling efficient polling.

Figure 16:
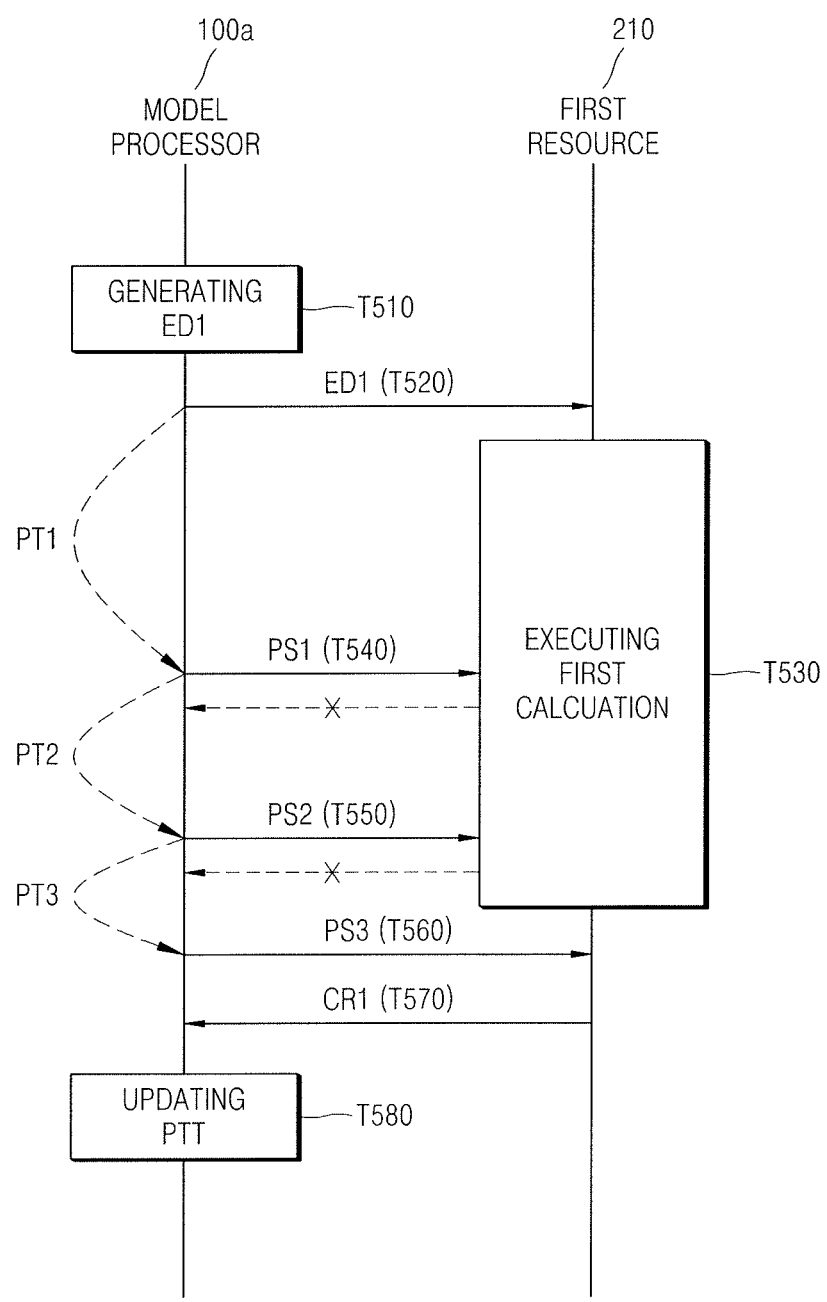
FIG. 16 illustrates a diagram of an operation of a neural network system according to an exemplary embodiment.

FIG. 16 is a diagram illustrating an operation of a neural network system according to an exemplary embodiment. In detail, FIG. 16 illustrates an embodiment where the neural network system performs polling while adaptively adjusting a polling time over time. Descriptions similar to or the same as those given above with reference to FIG. 15 are not repeated.

Referring to FIG. 16, the model processor 100a may compile a first subgraph to generate first execution data ED1 in operation T510 and may output the generated first execution data ED1 to a first resource 210 in operation T520. The first resource 210 may perform a first calculation operation based on the first execution data ED1 in operation T530.

In operation T540, the model processor 100a may output a first polling signal PS1 to the first resource 210 after a first polling time PT1, i.e., an initial polling time elapses from a time when the first execution data ED1 is output. Since the first calculation operation is not yet completed, the first resource 210 may not output a first calculation operation CR1. Since the model processor 100a does not receive the first calculation result CR1, the model processor 100a may change a polling time to a second polling time PT2, which is shorter than the first polling time PT1.

In operation T550, the model processor 100a may output a second polling signal PS2 to the first resource 210 after the second polling time PT2 elapses from a time when the first polling signal PSI is output. Since the first calculation operation is not still completed, the first resource 210 may not output the first calculation result CR1. Since the model processor 100a does not receive the first calculation result CR1, the model processor 100a may change a polling time to a third polling time PT3, which is shorter than the second polling time PT2.

In operation T560, the model processor 100a may output a third polling signal PS3 to the first resource 210 after the third polling time PT3 elapses from a time when the third polling signal PS3 is output. Since the first calculation operation is completed, the first resource 210 may output the first calculation result CR1 to the model processor 100a based on the third polling signal PS3 in operation T570. In operation T580, the model processor 100a may update a polling timetable PTT with a polling time (for example, a sum "PT1+PT2+PT3" of the first to third polling times PT1 to PT3) when polling succeeds.

Figure 17:
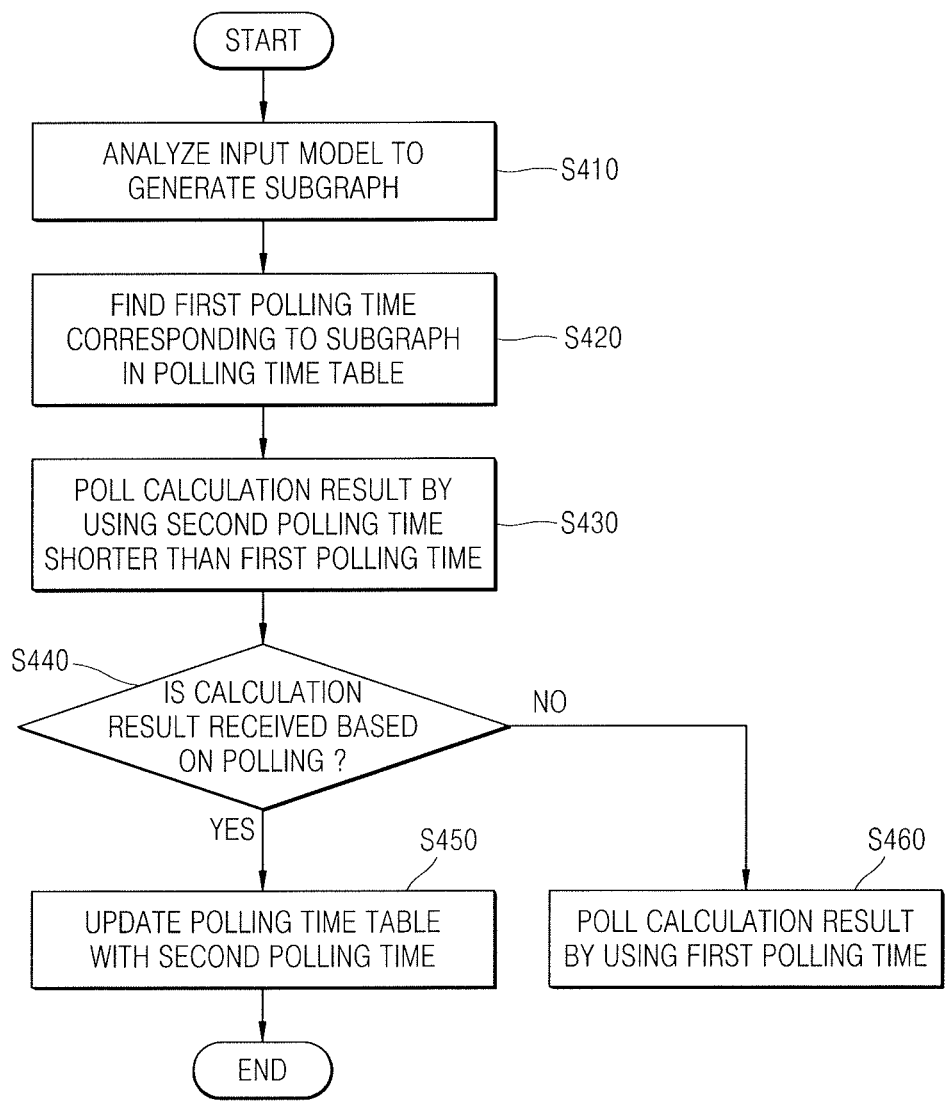
FIG. 17 illustrates a flowchart of an operating method of a model processor according to an exemplary embodiment.

FIG. 17 is a flowchart illustrating an operating method of the model processor 100a according to an exemplary embodiment. In detail, FIG. 17 illustrates an embodiment where the model processor 100a adaptively updates a polling timetable.

Referring to FIGS. 12 and 17, the model processor 100a may analyze an input model to generate subgraphs SG1 to SG3 in operation S410 and may find a first polling time corresponding to each of the subgraphs SG1 to SG3 in a polling timetable PTT in operation S420. In operation S430, the model processor 100a may poll a calculation result by using a second polling time, which is shorter than the found first polling time.

When the calculation result is received from a resource based on polling using the second polling time in operation S440, the model processor 100a may update a polling timetable PTT with the second polling time in operation S450. When the calculation result is not received from the resource based on the polling using the second polling time in operation S440, the model processor 100a may poll the calculation result using the first polling time in operation S460.

The model processor 100a according to an embodiment may perform polling by using a polling time, which is shorter than a polling time found in the polling timetable PTT, thereby finding an optimal polling time and performing efficient polling.

Figure 18A:
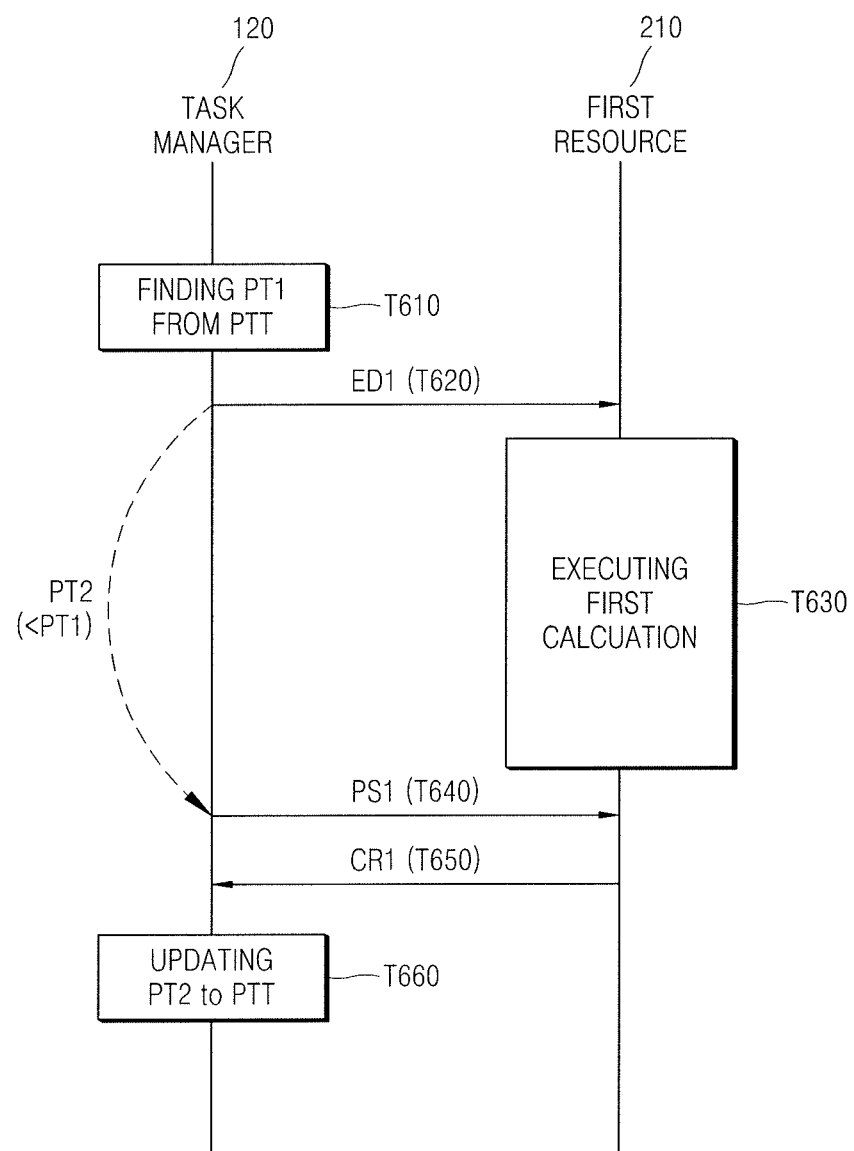
FIGS. 18A and 18B illustrate diagrams of an operation of a neural network system according to an exemplary embodiment.
Figure 18B:
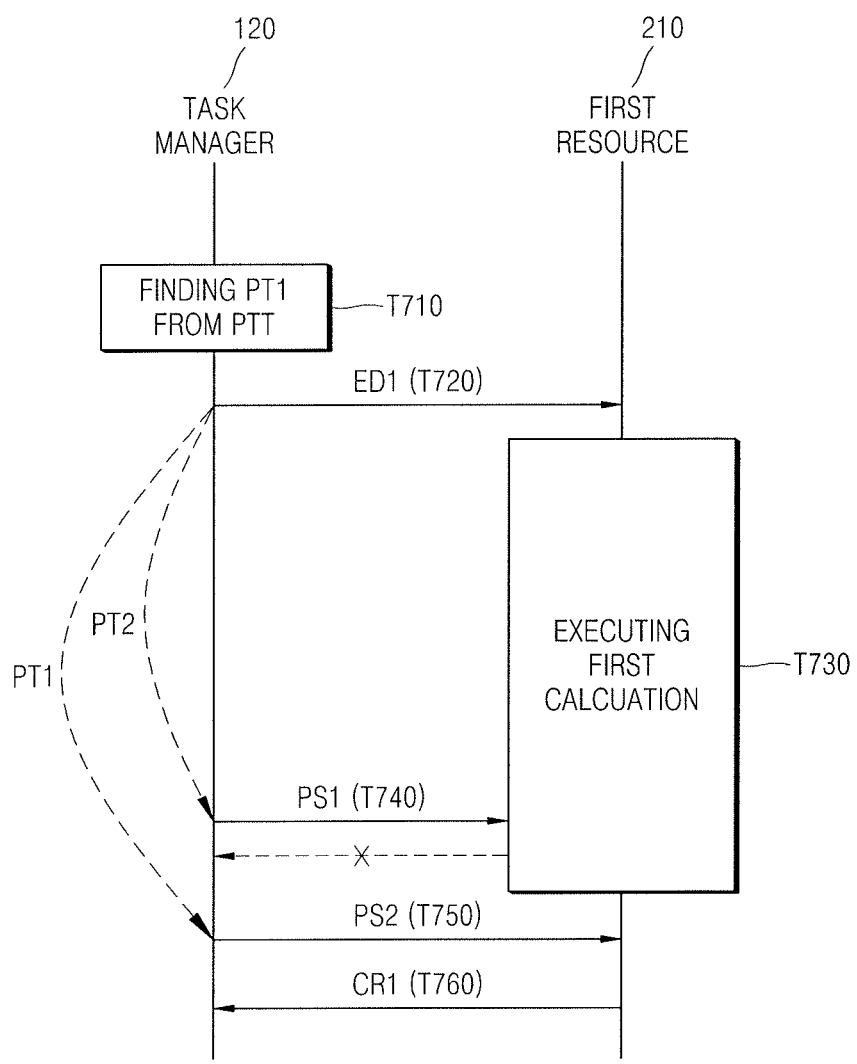

FIGS. 18A and 18B are diagrams illustrating an operation of a neural network system according to an exemplary embodiment. In detail, FIGS. 18A and 18B illustrate an embodiment where the neural network system adaptively updates a polling timetable over time. Descriptions similar to or the same as those given above with reference to FIG. 17 are omitted.

Referring to FIG. 18A, the task manager 120 may find a first polling time PT1 corresponding to a first subgraph in the polling timetable PTT in operation T610 and may output first execution data ED1, obtained by compiling the first subgraph, to a first resource 210 in operation T620. The first resource 210 may perform a first calculation operation based on the first execution data ED1 received thereby in operation T630.

In operation T640, the task manager 120 may output a first polling signal PS1 to the first resource 210 after a second polling time PT2 elapses from a time when the first execution data ED1 is output. The second polling time PT2 may be shorter than the first polling time PT1 found in the polling timetable PTT.

When the first calculation operation is completed, the first resource 210 may output a first calculation result CR1 to the task manager 120 based on the first polling signal PS1 in operation T650. In operation T660, the task manager 120 may update the polling timetable PTT with the second polling time PT2 when polling succeeds, so as to correspond to the first subgraph.

Referring to FIG. 18B, a task manager 120 may find a first polling time PT1 corresponding to a first subgraph in a polling timetable PTT in operation T710 and may output first execution data ED1 to a first resource 210 in operation T720. The first resource 210 may perform a first calculation operation based on the first execution data ED1 received thereby in operation T730.

In operation T740, the task manager 120 may output a first polling signal PS1 to the first resource 210 after a second polling time PT2 elapses from a time when the first execution data ED1 is output. Since the first calculation operation is not yet completed, the first resource 210 may not output a first calculation result CR1.

In operation T750, the task manager 120 may output a second polling signal PS2 to the first resource 210 based on the first polling time PT1 (e.g., a time after the first polling time PT1 elapses from a time when the first execution data ED1 is output). When the first calculation operation is completed, the first resource 210 may output a first calculation result CR1 to the task manager 120 based on the second polling signal PS2 in operation 1760. In the embodiment of FIG. 18B, the second polling time PT2 may be a time when polling fails and, thus, the task manager 120 may not update the polling timetable PTT.

Figure 19:
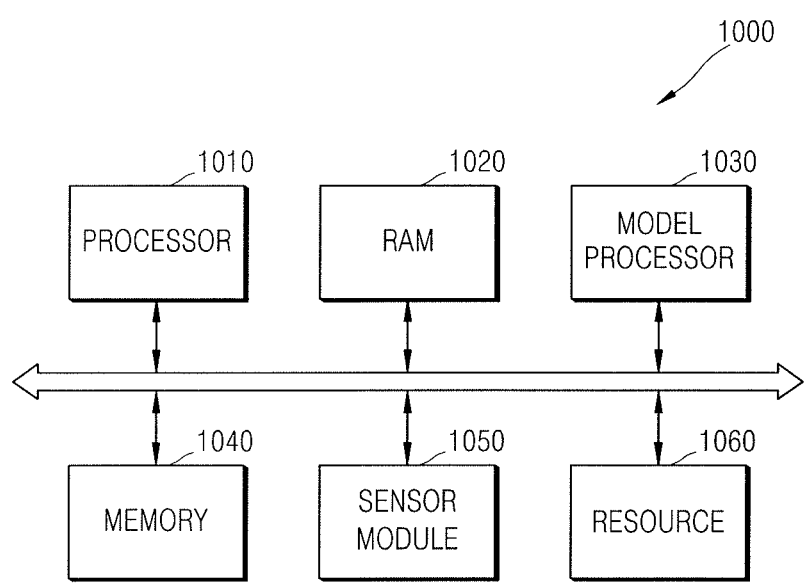
FIG. 19 illustrates an electronic system according to an exemplary embodiment.

FIG. 19 illustrates an electronic system 1000 according to an exemplary embodiment. Referring to FIG. 19, the electronic system 1000 may analyze input data in real time to extract effective information, based on a neural network, and may determine situations or control elements of an electronic device equipped in the electronic system 1000, based on the extracted information. For example, the electronic system 100 may be applied to drones, robot devices such as an advanced driver assistance system (ADAS), smart televisions (TVs), smartphones, medical devices, mobile devices, image display devices, measurement devices, Internet of things (IoT) devices, and moreover, may be equipped in at least one of various kinds of electronic devices.

The electronic system 1000 may include a processor 1010, random access memory (RAM) 1020, a model processor 1030, a memory 1040, a sensor module 1050, and a resource 1060. The elements of the electronic system 1000 may be connected to one another through a bus. The processor 1010 may control all operations of the electronic system 1000. For example, the processor 1010 may execute programs stored in the RAM 1020 to control a function of the model processor 1030. Also, the processor 1010 may control the RAM 1020 and the memory 1040 to output an input model, which will perform deep learning based on the neural network, to the model processor 1030. The RAM 1020 may temporarily store the programs, data, applications, instructions, and/or the like.

The model processor 1030 may control the resource 1060 to perform a calculation operation of the neural network and may generate an information signal based on a result of the performing the calculation operation of the neural network. In an embodiment, the model processor 1030 may be implemented with software stored in a system memory (e.g., read-only memory (ROM)) and may operate based on control by the processor 1010. The memory 1040 may be a storage for storing data, and for example, may store various pieces of data generated in a process of performing a calculation operation of each of the model processor 1030 and the resource 1060. The sensor module 1050 may sense or receive a signal (e.g., an image signal, a sound signal, a magnetic signal, a bio signal, a touch signal, or the like) from the outside of the electronic system 1000 and may convert the sensed or received signal into data. The resource 1060 may include a calculation resource for performing a plurality of calculation operations based on the neural network or a communication resource which is implemented with various wired or wireless interfaces for communicating with an external device.

According to an embodiment, the model processor 1030 may predict a polling time and may poll a calculation result from the resource 1060 at the predicted polling time, whereby a calculation processing operation may be effectively performed.

According to an embodiment, the model processor 1030 may dynamically determine a polling time and may update a polling timetable with the determined polling time to determine an optimal polling time, whereby a calculation processing operation may be effectively performed.

The exemplary embodiments may be written as a program executable by a computer and may be implemented in general-purpose digital computers which operate a program by using a computer-readable recoding medium. Also, a structure of data used in the exemplary embodiments may be recorded in the computer-readable recoding medium by using various means. The computer-readable recording medium may include a magnetic storage medium (for example, ROM, floppy disk, hard disk, etc.) and an optical readable medium (for example, CD ROM, DVD, etc.).

One or more embodiments provides a neural network system which predicts a polling time when a resource completes calculation and polls a calculation result from the resource at the predicted polling time and a neural network model processing method using the neural network system.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A computer-based neural network system, comprising:
   a model processor that includes:
      a first compiler configured to generate a program file that includes first execution data by compiling a first subgraph, the first subgraph being included in a first calculation processing graph;
      a model analyzer comprising a model optimizer configured to perform an optimization operation on the first calculation processing graph, the optimization operation minimizing the number of calculations of the first calculation processing graph; and
      a task manager configured to receive the optimized first calculation processing graph from the model optimizer and output the first execution data, the model processor being implemented in hardware or a combination of hardware and software; and
   a first hardware resource configured to:
      receive the first execution data from the task manager, and
      generate a first calculation result obtained by performing at least one calculation operation on the first execution data,
   wherein the task manager is further configured to:
      calculate a predicted first polling time associated with the at least one calculation operation, the predicted first polling time indicating a predicted time that the first calculation operation will complete and when the first calculation result from the first calculation operation will be polled, and poll the first calculation result from the first hardware resource at the predicted first polling time, the first hardware resource transmitting the first calculation result to the model processor in response to the polling by the task manager; and wherein the model processor is further configured to:
determine that the first calculation result is received from the first hardware resource,
determine that the predicted first polling time is not stored in a polling timetable comprising at least one polling time associated with the first subgraph,
update the polling timetable to include the predicted first polling time, and
use the updated polling timetable to poll a subsequent calculation result.

2. The computer-based neural network system as claimed in claim 1, wherein:
the first calculation processing graph further includes a second subgraph,
the neural network system further includes:
a second hardware resource configured to generate a second calculation result obtained by performing a second calculation operation corresponding to the second subgraph based on the first calculation result and second execution data; and
a second compiler configured to generate the second execution data by compiling the second subgraph to be driven by the second hardware resource, and
the task manager is further configured to:
calculate a predicted second polling time associated with the second calculation operation, the predicted second polling time indicating a predicted time that the second calculation operation will complete and when the second calculation result from the second calculation operation will be polled, and
poll the second calculation result from the second hardware resource after the predicted first polling time and the predicted second polling time elapse.

3. The computer-based neural network system as claimed in claim 2, wherein the model analyzer is configured to:
receive a first input model,
analyze the first input model to generate the first calculation processing graph, and
divide the first calculation processing graph into a plurality of subgraphs including the first subgraph and the second subgraph.

4. The computer-based neural network system as claimed in claim 3, wherein the model analyzer further comprises:
a model parser configured to:
receive the first input model, and
extract model information including size information about the first input model; and
a model builder configured to analyze the first input model based on the model information to generate the first calculation processing graph.

5. The computer-based neural network system as claimed in claim 3, wherein
the model analyzer is further configured to receive a second input model and analyze the second input model to generate a second calculation processing graph including a third subgraph,
the first hardware resource is further configured to generate a third calculation result obtained by performing a third calculation operation corresponding to the third subgraph, and
the task manager is further configured to:
calculate a predicted third polling time associated with the third calculation operation, the predicted third polling time indicating a predicted time that the third calculation operation will complete and when the third calculation result from the third calculation operation will be polled, and
poll the third calculation result from the first hardware resource at the predicted third polling time.

6. The computer-based neural network system as claimed in claim 5, wherein the predicted third polling time is calculated based on a time that elapses from a time when the second hardware resource completes the second calculation operation.

7. The computer-based neural network system as claimed in claim 5, wherein the predicted third polling time is calculated based on a time that elapses from a time when the first hardware resource completes a first calculation operation corresponding to the first subgraph.

8. The computer-based neural network system as claimed in claim 1, wherein the task manager is further configured to calculate the predicted first polling time based on at least one of:
size information about an input model corresponding to the first calculation processing graph,
size information about the first subgraph,
size information about the first execution data, or
a compiling time for which the first compiler compiles the first subgraph.

9. The computer-based neural network system as claimed in claim 1, wherein the task manager is further configured to calculate the predicted first polling time based on a calculation processing ability of the first hardware resource.

10. The computer-based neural network system as claimed in claim 9, wherein:
a first calculation operation, which corresponds to the first subgraph, includes n (where n is an integer greater than zero) number of first sub-calculations and m (where m is an integer or greater than zero) number of second sub-calculations,
a first time is taken to complete each of the first sub-calculations by the first hardware resource, and
a second time is taken to complete each of the second sub-calculations by the first hardware resource, and the task manager is further configured to calculate the predicted first polling time as a sum of n times the first time and m times the second time.

11. The computer-based neural network system as claimed in claim 1, wherein the first calculation processing graph includes a plurality of subgraphs, and the polling timetable stores information about the plurality of subgraphs and information about a polling time corresponding to each of the plurality of subgraphs.

12. The computer-based neural network system as claimed in claim 11, wherein
the task manager is further configured to:
determine that the polling timetable has stored therein the predicted first polling time corresponding to the first subgraph, before calculating a polling time corresponding to the first subgraph, and
perform polling using the polling timetable based on the predicted first polling time being stored in the polling timetable.

13. The computer-based neural network system as claimed in claim 11, wherein the model keeper is configured to store, in the polling timetable, information about a resource characteristic of a respective resource where calculation corresponding to each of the plurality of subgraphs is performed.

14. The computer-based neural network system as claimed in claim 1, further comprising a model keeper configured to store polling timetable information.

15. A method of processing a neural network model using a calculation processing graph including a first subgraph, the method comprising:
- calculating, based on information about the first subgraph, a predicted first polling time associated with a first calculation operation corresponding to the first subgraph, the predicted first polling time indicating a predicted time that the first calculation operation will complete and when a first calculation result from the first calculation operation will be polled;
- using a compiler to generate a program file that includes first execution data by compiling the first subgraph;
- performing an optimization operation on the calculation processing graph, the optimization operation minimizing the number of calculations of the calculation processing graph;
- receiving the optimized calculation processing graph;
- outputting the first execution data to a first hardware resource;
- generating the first calculation result by performing at least one calculation on the first execution data;
- polling the first calculation result corresponding to the first execution data from the first hardware resource at the predicted first polling time;
- transmitting the first calculation result responsive to the polling;
- determining that the first calculation result is received from the first hardware resource; determining that the predicted first polling time is not stored in the polling timetable;
- updating a polling timetable to include the predicted first polling time; and
- using the updated polling timetable to poll a subsequent calculation result.

16. The method as claimed in claim 15, wherein the calculating of the predicted first polling time is based on at least one of:
- size information about an input model corresponding to the calculation processing graph,
- size information about the first subgraph,
- size information about the first execution data,
- a compiling time for which the compiler compiles the first subgraph, or
- a calculation processing ability of the first hardware resource.

17. The method as claimed in claim 15, further comprising using a model keeper to store polling timetable information.

18. A non-transitory computer-readable storage medium that when executed by a processor performs a method of processing a neural network model using a calculation processing graph including a first subgraph, the method comprising:
- calculating, based on information about the first subgraph, a predicted first polling time associated with a first calculation operation corresponding to the first subgraph, the predicted first polling time indicating a predicted time that the first calculation operation will complete and when a first calculation result from the first calculation operation will be polled;
- using a compiler to generate a program file that includes first execution data by compiling the first subgraph;
- performing an optimization operation on the calculation processing graph, the optimization operation minimizing the number of calculations of the calculation processing graph;
- receiving the optimized calculation processing graph;
- outputting the first execution data to a first hardware resource;
- generating the first calculation result by performing at least one calculation on the first execution data;
- polling the first calculation result corresponding to the first execution data from the first hardware resource at the predicted first polling time;
- transmitting the first calculation result responsive to the polling;
- determining that the first calculation result is received from the first hardware resource;
- determining that the predicted first polling time is not stored in the polling timetable;
- updating a polling timetable to include the predicted first polling time; and
- using the updated polling timetable to poll a subsequent calculation result.

19. The non-transitory computer-readable storage medium as claimed in claim 18, the method further comprising assigning information about the subgraph into a predetermined equation to calculate the predicted first polling time.

20. The non-transitory computer-readable storage medium as claimed in claim 18, the method further comprising calculating the predicted first polling time based on at least one of:
- size information about an input model corresponding to the calculation processing graph, or
- a calculation processing ability of the first hardware resource.

* * * * *